US012732862B2

(12) United States Patent
Yang et al.

(10) Patent No.: US 12,732,862 B2
(45) Date of Patent: Sep. 8, 2026

(54) DATA PACKET DECOMPRESSION METHOD, ELECTRONIC DEVICE, AND NETWORK SIDE DEVICE

(71) Applicant: Huawei Technologies Co., Ltd., Shenzhen (CN)

(72) Inventors: Jianhua Yang, Shanghai (CN); Ao Guo, Shanghai (CN); Chuting Yao, Beijing (CN); Jian Wang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 558 days.

(21) Appl. No.: 18/041,178

(22) PCT Filed: Aug. 9, 2021

(86) PCT No.: PCT/CN2021/111456
§ 371 (c)(1),
(2) Date: Feb. 9, 2023

(87) PCT Pub. No.: WO2022/033418
PCT Pub. Date: Feb. 17, 2022

(65) Prior Publication Data

US 2023/0308944 A1 Sep. 28, 2023

(30) Foreign Application Priority Data

Aug. 10, 2020 (CN) ........................ 202010795116.4

(51) Int. Cl.
*H04W 28/06* (2009.01)
*H04W 28/02* (2009.01)
*H04W 28/04* (2009.01)
*H04W 80/02* (2009.01)

(52) U.S. Cl.
CPC ....... *H04W 28/06* (2013.01); *H04W 28/0278* (2013.01); *H04W 28/04* (2013.01); *H04W 80/02* (2013.01)

(58) Field of Classification Search
CPC ...... H04L 69/04; H04L 69/324; H04W 28/04; H04W 28/06; H04W 28/0278; H04W 36/0064; H04W 76/19; H04W 24/10
USPC ........................................ 370/216, 329, 331
See application file for complete search history.

(56) References Cited

U.S. PATENT DOCUMENTS

2020/0344629 A1* 10/2020 Kim ..................... H04W 24/10
2020/0344644 A1* 10/2020 Liu ......................... H04L 69/04

* cited by examiner

*Primary Examiner* — Harun Chowdhury
(74) *Attorney, Agent, or Firm* — WOMBLE BOND DICKINSON (US) LLP

(57) ABSTRACT

Embodiments of this application provide a data packet decompression method. In the method, the network side device receives a first PDCP data packet, decompresses the first PDCP data packet, and sends a first buffer data identifier to the electronic device if the first PDCP data packet fails to be decompressed, where the first buffer data identifier corresponds to buffer data used for decompressing the first PDCP data packet; the electronic device receives the first buffer data identifier, and sends first buffer data corresponding to the first buffer data identifier to the network side device, where the first buffer data is buffer data used for generating the first PDCP data packet; and the network side device receives the first buffer data, and decompresses the first PDCP data packet by using the first buffer data.

8 Claims, 15 Drawing Sheets

Figures 7, 8:
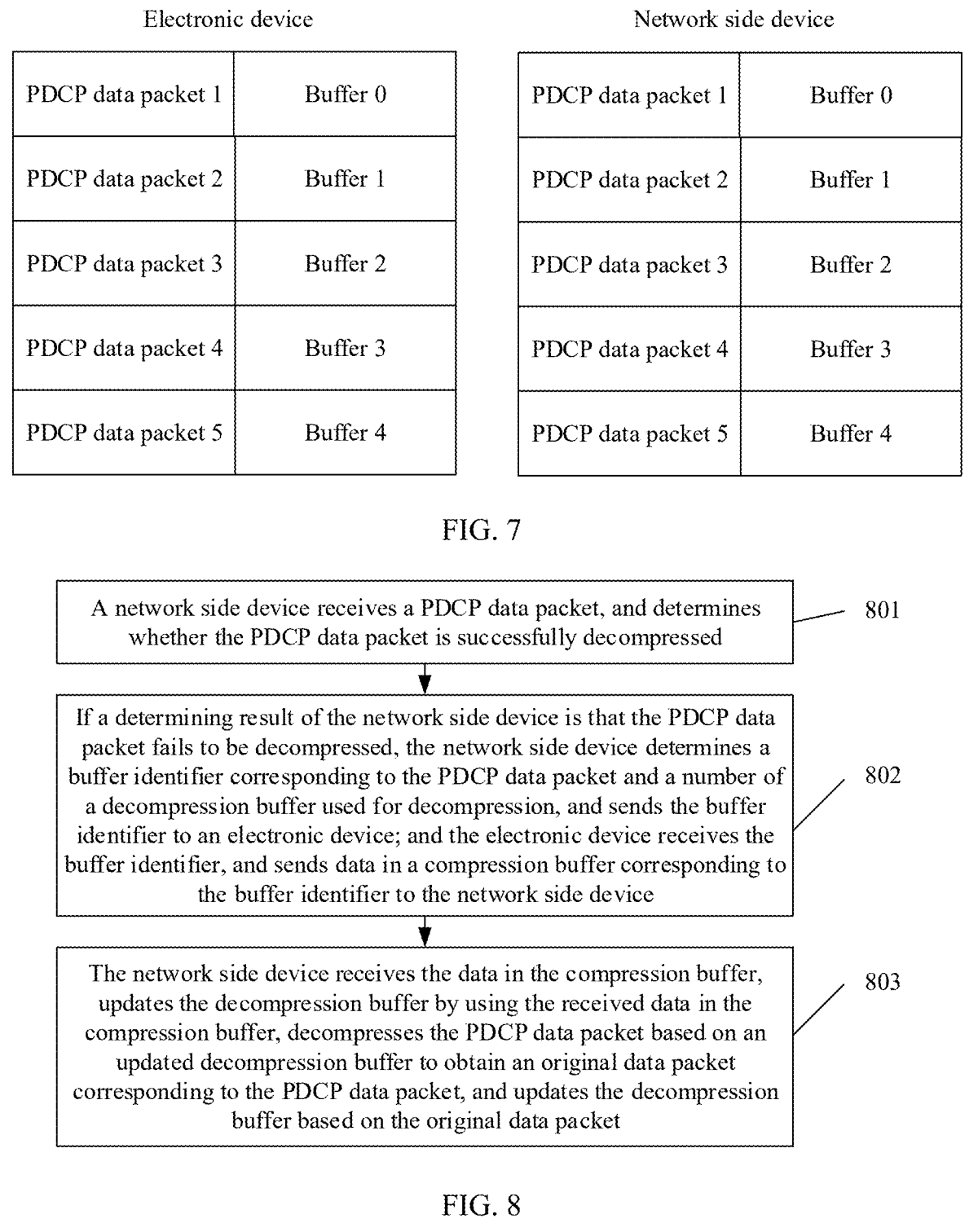

Electronic device

| PDCP data packet 1 | Buffer 0 |
|---|---|
| PDCP data packet 2 | Buffer 1 |
| PDCP data packet 3 | Buffer 2 |
| PDCP data packet 4 | Buffer 3 |
| PDCP data packet 5 | Buffer 4 |

Network side device

| PDCP data packet 1 | Buffer 0 |
|---|---|
| PDCP data packet 2 | Buffer 1 |
| PDCP data packet 3 | Buffer 2 |
| PDCP data packet 4 | Buffer 3 |
| PDCP data packet 5 | Buffer 4 |

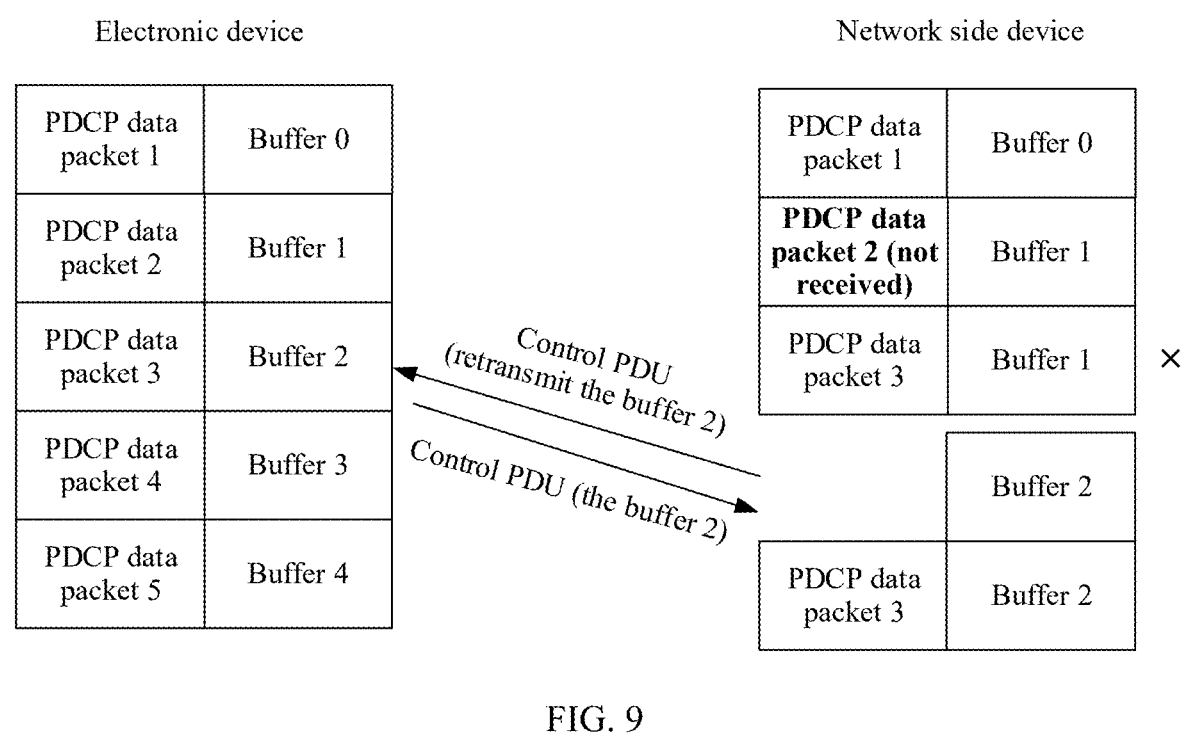

Electronic device

| PDCP data packet 1 | Buffer 0 |
| --- | --- |
| PDCP data packet 2 | Buffer 1 |
| PDCP data packet 3 | Buffer 2 |
| PDCP data packet 4 | Buffer 3 |
| PDCP data packet 5 | Buffer 4 |

Network side device

| PDCP data packet 1 | Buffer 0 |
| --- | --- |
| **PDCP data packet 2 (not received)** | Buffer 1 |
| PDCP data packet 3 | Buffer 1 | ×

| | Buffer 2 |
| --- | --- |
| PDCP data packet 3 | Buffer 2 |

Control PDU (retransmit the buffer 2)

Control PDU (the buffer 2)

FIG. 9

DATA PACKET DECOMPRESSION METHOD, ELECTRONIC DEVICE, AND NETWORK SIDE DEVICE

CROSS-REFERENCE TO RELATED APPLICATIONS

This application is a National Stage of International Application No. PCT/CN2021/111456, filed on Aug. 9, 2021, which claims priority to Chinese Patent Application No. 202010795116.4, filed on Aug. 10, 2020, both of which are hereby incorporated by reference in their entireties.

TECHNICAL FIELD

This application relates to the field of data transmission, and in particular, to a data packet decompression method, an electronic device, and a network side device.

BACKGROUND

Data transmitted between an electronic device such as user equipment (UE) and a network side device such as an evolved Node B (eNB) usually needs to pass through a packet data convergence protocol (PDCP), a radio link control (RLC) protocol, media access control (MAC), and a physical layer (PHY). Each layer completes different data processing.

The PDCP mainly performs security operations and header compression/decompression processing, for example, encryption and integrity protection, robust header compression (ROHC) and decompression. The RLC mainly implements data segmentation and concatenation, in-order delivery, and automatic repeat-request (ARQ) data transmission guarantee. The MAC mainly completes scheduling, concatenation processing of different logical channels, and hybrid automatic repeat request (HARQ) operations. The physical layer converts transport blocks into packets and transmits the packets through an air interface.

An uplink data compression (UDC) technology is introduced in a transmission of an acknowledged mode (AM) of long term evolution (LTE), and is implemented at the PDCP layer. The UDC technology is mainly used for some data packets that have a large amount of duplicate content, where redundant information between packets is compressed, to reduce an amount of to-be-transmitted data, so as to reduce an amount of data transmitted through an air interface, and reduce uplink resources. Specifically, in the UDC technology, as a transmitting end, an electronic device compresses a received data packet of an uplink application layer, and generates a PDCP data packet based on a compressed data packet. A structure of the PDCP data packet is shown in FIG. 1. A PDCP layer product serial number (SN) is included in a PDCP header. As a receiving end, a network side device obtains the compressed data packet (namely, the compressed data packet in the electronic device) from the received PDCP data packet, and decompresses the compressed data packet to obtain an original data packet (namely, the data packet of the uplink application layer in the electronic device).

Principles of data compression and decompression in the UDC technology are described as follows. In the UDC, data packets are compressed and decompressed based on a buffer. The buffer stores a character string, and the character string is commonly referred to as a dictionary. According to a protocol, a size of the buffer is 2 KB, 4 KB, or 8 KB. When a data packet is compressed, the data packet is compared with the dictionary, and some fields that are the same as the dictionary in the data packet are removed as redundancy, to reduce an amount of transmitted data. Decompression is to restore the redundancy in the data packet based on the dictionary, and fill the restored redundancy into a decompressed data packet to obtain the original data packet. A size of the dictionary is less than or equal to the size of the buffer. For example, in the Arena of Valor application, when a buffer is set to 8 KB, a size of a dictionary is less than 4 KB.

For example, as shown in FIG. 2, in an electronic device, it is assumed that a preset dictionary or an initial dictionary in a buffer is abc, and a buffer including the preset dictionary or the initial dictionary is referred to as a buffer 0. After a packet 1 is compressed based on the dictionary abc in the buffer 0, the packet 1 is placed in the buffer 0 to obtain a buffer 1 that includes a dictionary abc-def. In a network side device, before the compressed packet 1 is received, an initial buffer also has only a preset dictionary or an initial dictionary abc, namely, the buffer 0. After the compressed packet 1 is received, the compressed packet 1 is decompressed based on the dictionary abc in the buffer 0, to obtain the packet 1, which may be def, and then data in the packet 1 is stored in a buffer (namely, the buffer 0) of the network side device from back to front. In this case, the buffer in the network side device also changes to the buffer 1 including the dictionary abc-def, to implement unification of the buffer in the electronic device and the buffer in the network side device. Similarly, after compressing a packet 2, the electronic device places the packet 2 into the buffer 1, to obtain a buffer 2. Because a size of a buffer is fixed, data that is placed later squeezes previous data out of the buffer. This is similar to a process in which the packet 2 is added to the buffer in the figure. After receiving the compressed packet 2, the network side device decompresses the compressed packet 2 based on the dictionary abc-def in the buffer 1, to obtain the packet 2, and stores data in the packet 2 in the buffer 1 from the back to the front, to obtain the buffer 2. Based on the foregoing compression and decompression principles of the UDC, it may be learned that, when the network side device decompresses a data packet, successful decompression of a next data packet depends on successful decompression of a previous data packet. Once decompression of a data packet fails, data packets following the data packet cannot be successfully decompressed.

In the network side device, a large quantity of data packets are easily lost due to a decompression failure of a data packet, and lost data needs to be retransmitted from a TCP/IP layer at an upper layer of the PDCP in the electronic device. This results in a waste of data processing resources and uplink data transmission resources of the electronic device and the network side device.

SUMMARY

This application provides a data packet decompression method, an electronic device, and a network side device, to reduce resource waste caused by a data packet decompression failure.

In some embodiments, this application provides a data packet decompression method, where the method includes:

A network side device receives a first PDCP data packet, decompresses the first PDCP data packet, and sends a first buffer data identifier to an electronic device if the first PDCP data packet fails to be decompressed, where the first buffer data identifier corresponds to buffer data used for decompressing the first PDCP data packet;

the electronic device receives the first buffer data identifier, and sends first buffer data corresponding to the first buffer data identifier to the network side device, where the first buffer data is buffer data used for generating the first PDCP data packet; and the network side device receives the first buffer data, and decompresses the first PDCP data packet by using the first buffer data.

In the method, when the network side device fails to decompress the first PDCP data packet, the electronic device sends, to the network side device, the first buffer data used for decompressing the first PDCP data packet, and the network side device may successfully decompress the first PDCP data packet by using the first buffer data. Therefore, a case in which a large quantity of data packets are lost due to a data packet decompression failure does not occur in the network side device, so that resource waste caused by the data packet decompression failure is reduced.

In some embodiments, the first buffer data identifier is an identifier of a decompression buffer used for decompressing the first PDCP data packet, or an identifier of a decompression buffer that is updated based on an original data packet of the first PDCP data packet, or an identifier of a compression buffer used for generating the first PDCP data packet, or an identifier of a compression buffer that is updated based on the original data packet of the first PDCP data packet.

In the method, the identifier of the compression buffer or the decompression buffer associated with the first PDCP data packet is used as the first buffer data identifier, so that buffer data required by the network side device can be accurately indicated to the electronic device, to ensure that the network side device obtains accurate buffer data from the electronic device and successfully decompresses the first PDCP data packet.

In some embodiments, before the sending first buffer data corresponding to the first buffer data identifier to the network side device, the method further includes:

The electronic device determines that a size of the first buffer data does not exceed a preset maximum threshold.

In the method, the maximum threshold is preset for the first buffer data, to prevent a problem such as a waste of transmission resources or an unsuccessful transmission of the first buffer data caused by an excessively large amount of the first buffer data sent by the electronic device to the network side device.

In some embodiments, the sending first buffer data corresponding to the first buffer data identifier to the network side device includes:

sending the first buffer data to the network side device by using a control protocol data unit.

In some embodiments, this application provides a data packet decompression method, applied to a network side device, where the method includes:

receiving a first PDCP data packet; and decompressing the first PDCP data packet;

sending a first buffer data identifier to an electronic device if the first PDCP data packet fails to be decompressed, where the first buffer data identifier corresponds to buffer data used for decompressing the first PDCP data packet;

receiving first buffer data sent by the electronic device, where the first buffer data corresponds to the first buffer data identifier, and the first buffer data is buffer data used for generating the first PDCP data packet; and decompressing the first PDCP data packet by using the first buffer data.

In some embodiments, the first buffer data identifier is an identifier of a decompression buffer used for decompressing the first PDCP data packet, or an identifier of a decompression buffer that is updated based on an original data packet of the first PDCP data packet, or an identifier of a compression buffer used for generating the first PDCP data packet, or an identifier of a compression buffer that is updated based on the original data packet of the first PDCP data packet.

In some embodiments, the method further includes: receiving the first buffer data by using a control protocol data unit.

In some embodiments, this application provides a data packet decompression method, applied to an electronic device, where the method includes:

receiving a first buffer data identifier sent by a network side device, where the first buffer data identifier is sent after the network side device fails to decompress a received first PDCP data packet, and the first buffer data identifier corresponds to buffer data used for decompressing the first PDCP data packet; and sending first buffer data corresponding to the first buffer data identifier to the network side device, where the first buffer data is buffer data used for generating the first PDCP data packet.

In some embodiments, before the sending first buffer data corresponding to the first buffer data identifier to the network side device, the method further includes:

determining that a size of the first buffer data does not exceed a preset maximum threshold.

In some embodiments, the sending first buffer data corresponding to the first buffer data identifier to the network side device includes:

sending the first buffer data to the network side device by using a control protocol data unit.

In some embodiments, this application provides a data packet decompression method, where the method includes:

A network side device sends a first identifier to an electronic device if the network side device fails to decompress a first PDCP data packet within first duration;

the electronic device receives the first identifier, sends a second PDCP data packet to the network side device, and sends second buffer data to the network side device, where the second buffer data is buffer data used for generating the second PDCP data packet, and the second PDCP data packet is a next data packet of the first PDCP data packet; and the network side device receives the second buffer data and the second PDCP data packet, and decompresses the second PDCP data packet by using the second buffer data.

In the method, after the network side device fails to decompress the first PDCP data packet, the electronic device sends, to the network side device, the second buffer data used for generating the next PDCP data packet (that is, the second PDCP data packet) of the first PDCP data packet, and the network side device may successfully decompress the second PDCP data packet by using the second buffer data. Therefore, a case in which a large quantity of data packets are lost due to a data packet decompression failure does not occur in the network side device, so that resource waste caused by the data packet decompression failure is reduced.

In some embodiments, the first identifier is an NACK.

In some embodiments, before the sending second buffer data to the network side device, the method further includes:

determining that a size of the second buffer data does not exceed a preset maximum threshold.

In some embodiments, the sending second buffer data to the network side device includes:

sending the second buffer data to the network side device by using a control protocol data unit.

In some embodiments, this application provides a data packet decompression method, applied to a network side device, where the method includes:

sending a first identifier to an electronic device if a first PDCP data packet fails to be decompressed within first duration;

receiving a second PDCP data packet sent by the electronic device, where the second PDCP data packet is sent after the electronic device receives the first identifier, and the second PDCP data packet is a next data packet of the first PDCP data packet; and receiving second buffer data sent by the electronic device, where the second buffer data is sent after the electronic device receives the first identifier, and the second buffer data is buffer data used by the electronic device to generate the second PDCP data packet; and decompressing the second PDCP data packet by using the second buffer data.

In some embodiments, the first identifier is an NACK.

In some embodiments, the method further includes:

receiving the second buffer data by using a control protocol data unit.

In some embodiments, this application provides a data packet decompression method, applied to an electronic device, where the method includes:

receiving a first identifier from a network side device, where the first identifier is used to indicate that the network side device fails to decompress a first PDCP data packet within first duration; and in response to the first identifier, sending a second PDCP data packet to the network side device, and sending second buffer data to the network side device, where the second buffer data is buffer data used for generating the second PDCP data packet, and the second PDCP data packet is a next data packet of the first PDCP data packet.

In some embodiments, the first identifier is an NACK.

In some embodiments, before the sending second buffer data to the network side device, the method further includes:

determining that a size of the second buffer data does not exceed a preset maximum threshold.

In some embodiments, the sending second buffer data to the network side device includes:

sending the second buffer data to the network side device by using a control protocol data unit.

In some embodiments, this application provides a data packet decompression method, where the method includes:

An electronic device monitors a transmission result of a media access control MAC packet corresponding to each PDCP data packet, and sends second buffer data to a network side device if the electronic device detects that a quantity of retransmissions of at least one MAC packet corresponding to a first PDCP data packet reaches a preset quantity threshold, where the second buffer data is buffer data used for generating a second PDCP data packet, and the second PDCP data packet is a next data packet of the first PDCP data packet; and the network side device receives the second buffer data, and decompresses the received second PDCP data packet by using the second buffer data.

In the method, the electronic device detects that the quantity of retransmissions of at least one MAC packet corresponding to the first PDCP data packet reaches the preset quantity threshold, and sends, to the network side device, the second buffer data used for generating the next PDCP data packet (that is, the second PDCP data packet) of the first PDCP data packet; and the network side device may successfully decompress the second PDCP data packet by using the second buffer data. Therefore, a case in which a large quantity of data packets are lost due to a data packet decompression failure does not occur in the network side device, so that resource waste caused by the data packet decompression failure is reduced.

In some embodiments, before the sending second buffer data to a network side device, the method further includes:

determining that a size of the second buffer data does not exceed a preset maximum threshold.

In some embodiments, the sending second buffer data to a network side device includes:

sending the second buffer data to the network side device by using a control protocol data unit.

In some embodiments, this application provides a data packet decompression method, applied to a network side device, where the method includes:

receiving second buffer data sent by an electronic device, where the second buffer data is sent after the electronic device detects that a quantity of retransmissions of at least one MAC packet corresponding to a first PDCP data packet reaches a preset quantity threshold, the second buffer data is buffer data used by the electronic device to generate a second PDCP data packet, and the second PDCP data packet is a next data packet of the first PDCP data packet; and decompressing the received second PDCP data packet by using the second buffer data.

In some embodiments, the method further includes:

receiving the second buffer data by using a control protocol data unit.

In some embodiments, this application provides a data packet decompression method, applied to an electronic device, where the method includes:

monitoring a transmission result of a MAC packet corresponding to each PDCP data packet; and sending second buffer data to a network side device if it is detected that a quantity of retransmissions of at least one MAC packet corresponding to a first PDCP data packet reaches a preset quantity threshold, where the second buffer data is buffer data used by the electronic device to generate a second PDCP data packet, and the second PDCP data packet is a next data packet of the first PDCP data packet.

In some embodiments, before the sending second buffer data to a network side device, the method further includes:

determining that a size of the second buffer data does not exceed a preset maximum threshold.

In some embodiments, the sending second buffer data to a network side device includes:

sending the second buffer data to the network side device by using a control protocol data unit.

In some embodiments, this application provides a network side device, including:

one or more processors; a memory; and one or more computer programs, where the one or more computer programs are stored in the memory, the one or more computer programs include instructions, and when the instructions are executed by the device, the device is enabled to perform the method according to some embodiments in the present disclosure.

In some embodiments, this application provides a network side device, including:

one or more processors; a memory; and one or more computer programs, where the one or more computer programs are stored in the memory, the one or more computer programs include instructions, and when the instructions are executed by the device, the device is enabled to perform the method according to some embodiments in the present disclosure.

In some embodiments, this application provides a network side device, including:

one or more processors; a memory; and one or more computer programs, where the one or more computer programs are stored in the memory, the one or more computer programs include instructions, and when the instructions are executed by the device, the device is enabled to perform the method according to some embodiments in the present disclosure.

In some embodiments, this application provides an electronic device, including:

one or more processors; a memory; and one or more computer programs, where the one or more computer programs are stored in the memory, the one or more computer programs include instructions, and when the instructions are executed by the device, the device is enabled to perform the method according to some embodiments in the present disclosure.

In some embodiments, this application provides an electronic device, including:

one or more processors; a memory; and one or more computer programs, where the one or more computer programs are stored in the memory, the one or more computer programs include instructions, and when the instructions are executed by the device, the device is enabled to perform the method according to some embodiments in the present disclosure.

In some embodiments, this application provides an electronic device, including:

one or more processors; a memory; and one or more computer programs, where the one or more computer programs are stored in the memory, the one or more computer programs include instructions, and when the instructions are executed by the device, the device is enabled to perform the method according to some embodiments in the present disclosure.

In some embodiments, this application further provides a computer-readable storage medium. The computer-readable storage medium stores a computer program. When the computer program is run on a computer, the computer is enabled to perform the method according to some embodiments in the present disclosure.

In some embodiments, this application provides a computer program. When the computer program is executed by a computer, the computer is enabled to perform the method according to some embodiments in the present disclosure.

In some embodiments, all or some of programs may be stored in a storage medium encapsulated with a processor, or some or all of programs may be stored in a memory that is not encapsulated with a processor.

BRIEF DESCRIPTION OF DRAWINGS

To describe technical solutions in embodiments of the present disclosure more clearly, the following briefly introduces the accompanying drawings used for describing the embodiments. It is clearly that the accompanying drawings in the following descriptions show merely some embodiments of the present disclosure, and a person of ordinary skill in the art may still derive other drawings from these accompanying drawings without creative efforts.

FIG. 7 is an example diagram of a relationship between buffers and PDCP data packets maintained in an electronic device and a network side device according to an embodiment of this application;

FIG. 8 is a flowchart of an embodiment of a data packet decompression method according to an embodiment of this application;

FIG. 9 is an example diagram of the data packet decompression method shown in FIG. 8;

DESCRIPTION OF EMBODIMENTS

Terms used in embodiments of this application are only used to explain embodiments of this application, but are not intended to limit this application.

Figure 1:
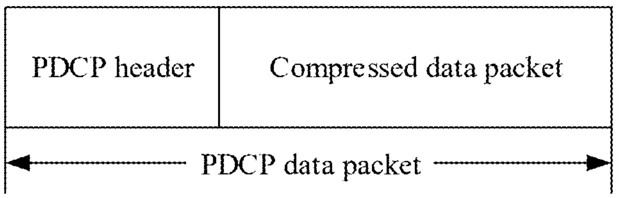
FIG. 1 is an example diagram of a structure of a PDCP data packet in the conventional technology.
Figure 2:
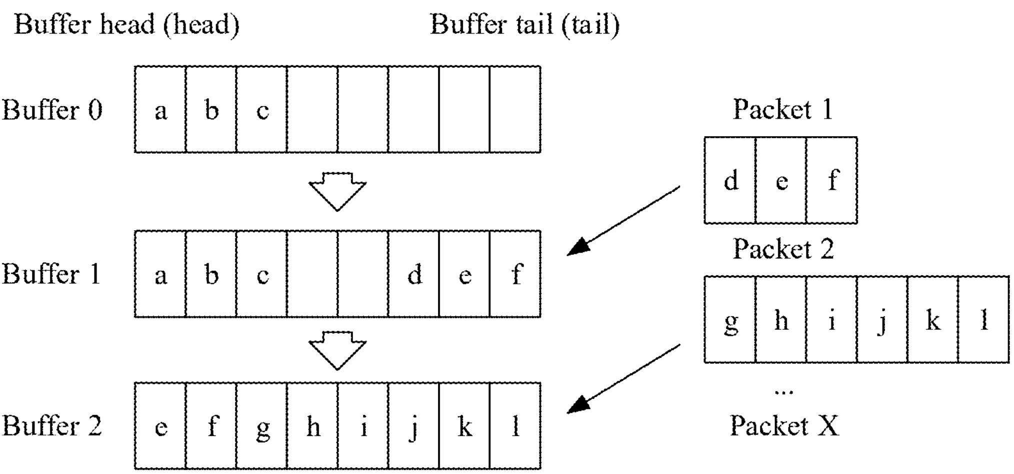
FIG. 2 is an example diagram of a principle of UDC compression and decompression in the conventional technology.
Figure 3:
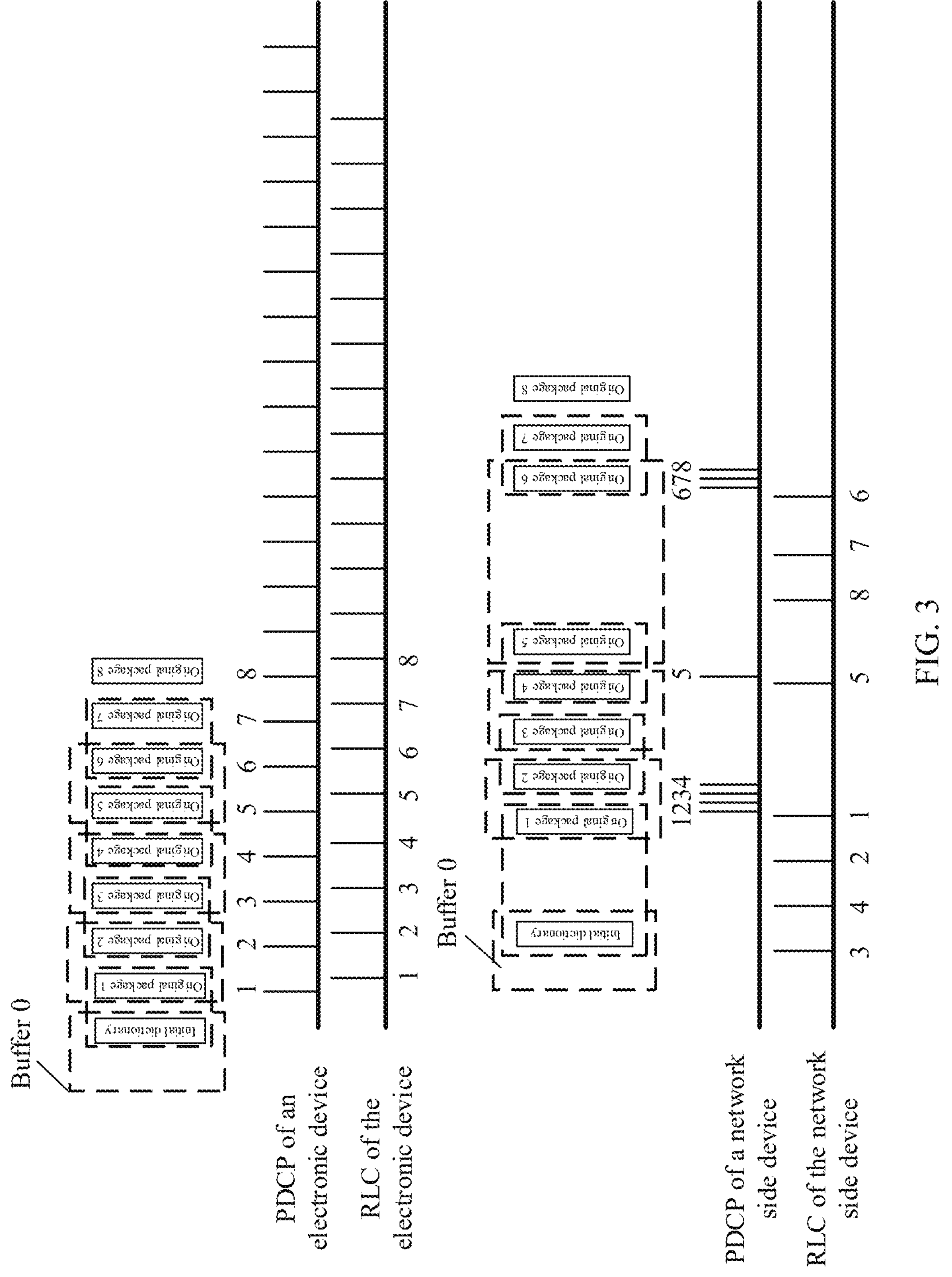
FIG. 3 is an example diagram of a PDCP data packet transmission process when a UDC technology is used in an AM mode of LTE in the conventional technology.

A data packet transmission process in a UDC technology in a conventional solution is first described. Currently, the UDC technology is applicable only to an AM mode of LTE. Usually, a PDCP layer of a network side device receives data packets in sequence, to ensure that a buffer in an electronic device is aligned with a buffer in the network side device, and implement sequential decompression. As shown in FIG. 3, for example, a size of a buffer is two data packets. One dashed box represents one buffer. Each row of buffers in upper and lower rows starts from a first dashed box representing a buffer 0, and subsequent dashed boxes sequentially represent a buffer 1 to a buffer 7. Buffers with same sequence numbers on the upper and lower rows are the same. It should be noted that an original packet shown in FIG. 3 refers to an original data packet. In a normal case, upper two lines are respectively a PDCP layer and an RLC layer of the electronic device, and lower two lines are respectively an RLC layer and a PDCP layer of the network side device. Packets 1 to 8 in PDCP data packets of the electronic device are sequentially transmitted from the PDCP layer to the RLC layer, and finally transmitted to the RLC layer of the network side device. After the RLC layer of the network side device sorts the received PDCP data packets, the RLC layer submits the received PDCP data packets to the PDCP layer for decompression. For example, as shown in FIG. 3, a packet 3 in the original data packets (namely, data packets of an uplink application layer) of the electronic device is compressed based on a buffer 2 that includes a packet 1 and a packet 2 in the original data packets, to generate the packet 3 of the PDCP data packet. The RLC layer of the network side device sorts the PDCP data packets 1 to 4 and submits the PDCP data packets 1 to 4 together to the PDCP layer. The packet 3 in the PDCP data packet is decompressed based on a buffer 2 that is updated after the packet 1 and the packet 2 are correctly decompressed, namely, the buffer 2 including an original data packet 1 (namely, the original package 1 shown in FIG. 3) and an original data packet 2 (namely, the original package 2 shown in FIG. 3). All numbers in FIG. 3 are PDCP SNs.

In LTE, there is a feedback mechanism for UDC decompression errors. When the network side device finds that a decompression error occurs on a PDCP data packet, the network side device feeds back, to the electronic device, a control protocol data unit (control PDU) in which a UDC decompression error occurs. After receiving the control PDU, the electronic device resets the buffer starting from an original data packet that currently needs to be compressed; compresses, based on a preset dictionary or an initial dictionary, the original data packet that currently needs to be compressed to generate a PDCP data packet; and indicates, in a UDC header, that the PDCP data packet is a PDCP data packet generated after the buffer is reset.

Figure 4:
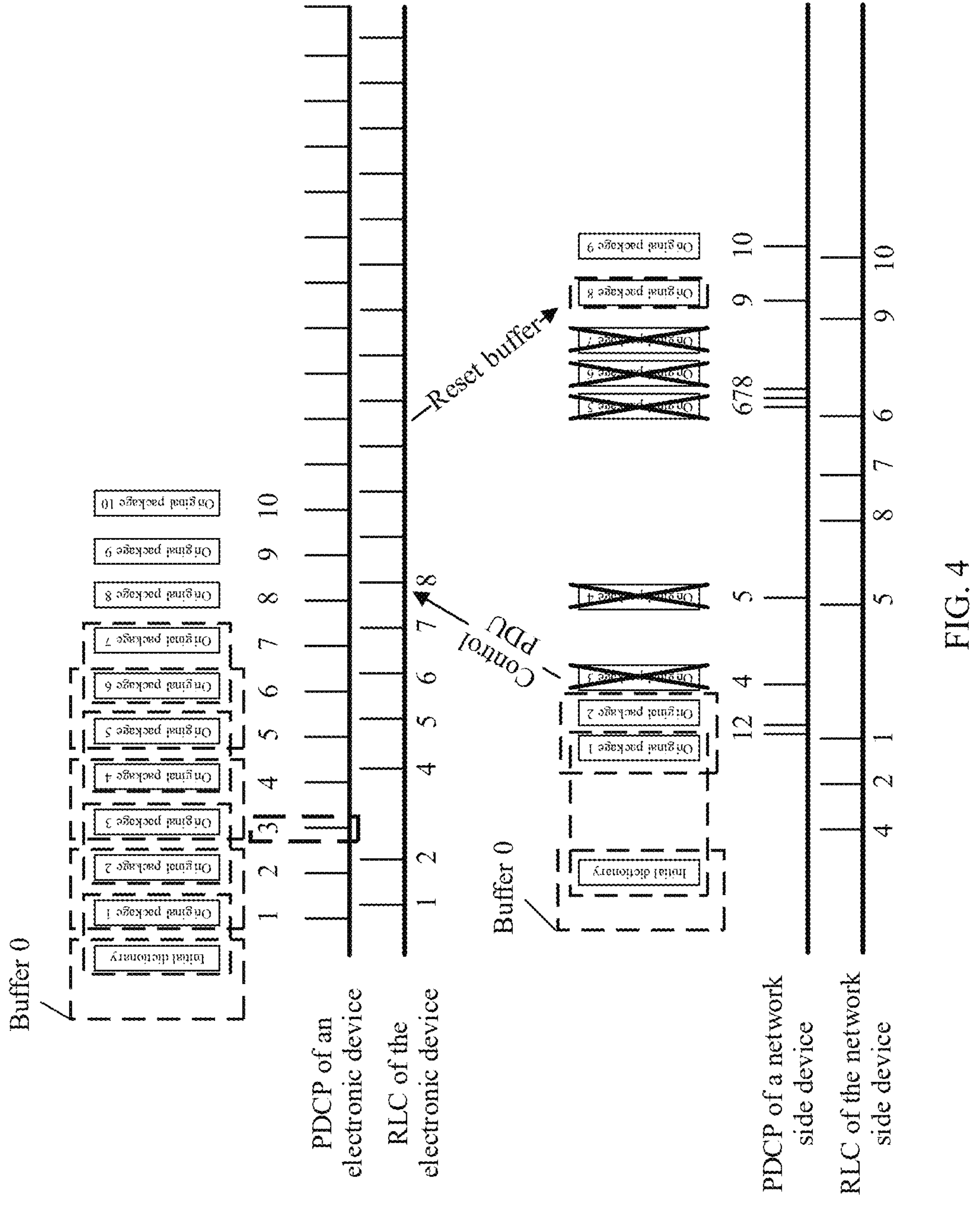
FIG. 4 is an example diagram of a processing procedure of a PDCP data packet decompression failure when a UDC technology is used in an AM mode of LTE in the conventional technology.

For example, for UDC transmission in LTE, in some cases, for example, when a discard timer expires, the PDCP layer of the electronic device may discard some PDCP data packets, and notifies the lower RLC layer to avoid sending an expired PDCP data packet through an air interface. As shown in FIG. 4, for example, after a packet 3 in PDCP data packets whose SNs are 1, 2, 3, and 4 at the PDCP layer are discarded due to an expiration, the PDCP layer may notify the RLC layer that the PDCP data packet 3 needs to be discarded, and numbers of PDCP data packets at the RLC layer also change as follows: a PDCP packet 1 corresponds to an RLC packet 1, a PDCP packet 2 corresponds to an RLC packet 2, and a PDCP packet 4 corresponds to an RLC packet 3. The network side device receives the PDCP data packets and submits the PDCP data packets to the PDCP layer. After the PDCP data packets 1 and 2 are decompressed, because the PDCP data packet 3 is discarded by the RLC layer in the electronic device, when the network side device decompresses the received PDCP data packet 4 (namely, the foregoing packet 3 of the RLC), a buffer used for decompression is inconsistent with a compression buffer used for compression, and a decompression error occurs. Further, the network side device may feed back a control PDU to the electronic device. However, as shown in FIG. 4, after the PDCP data packet 3 in the electronic device is discarded due to an expiration, PDCP data packets 4, 5, 6, 7, and 8 may be packed already. The PDCP data packets 4, 5, 6, 7, and 8 may still be sent by the electronic device normally and received by the network side device. The network side device sends the control PDU to require the electronic device to reset the buffer when the network device fails to decompress the PDCP data packet 4, but in this case, the PDCP data packets 5, 6, 7, and 8 in the electronic device are sent already. Therefore, the electronic device may reset the buffer starting from a PDCP data packet 9. The network side device fails to decompress all the PDCP data packets 4 to 8, and can normally decompress a PDCP data packet and send the PDCP data packet to the uplink application layer only from the PDCP data packet 9. In other words, all PDCP data packets (the PDCP data packets 4 to 8 in the figure) from a time when the network side device discovers the decompression failure (the PDCP data packet 4 in the figure) to a time when the network side device receives the PDCP data packet generated after the buffer is reset (the PDCP data packet 9 in the figure) are discarded due to the decompression failure, resulting in a large quantity of lost PDCP data packets. In addition, the uplink application layer needs to retransmit data in the lost PDCP data packets, causing a waste of data processing resources and uplink data transmission resources of the electronic device and the network side device.

Figure 5:
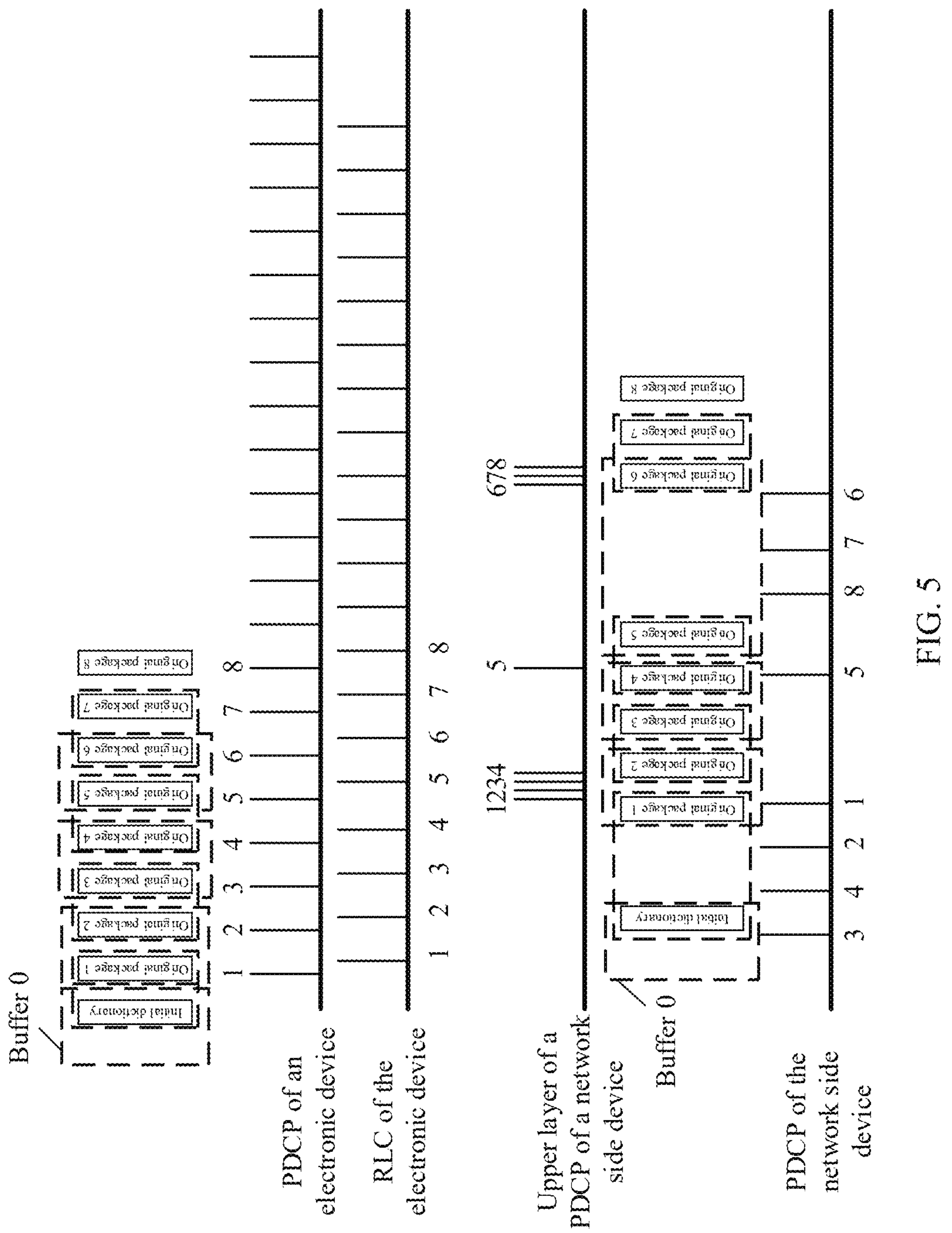
FIG. 5 is an example diagram of a PDCP data packet transmission process in which a UDC technology in an AM mode of LTE is reused to 5G NR.

Currently, the UDC technology is not used in 5G new radio (NR). If the UDC technology is used in 5G NR, definitely, a technical solution is reusing the foregoing existing UDC mechanism for a data radio bearer (DRB) transmission in an AM mode. For details, refer to FIG. 5. As shown in FIG. 5, a PDCP data packet compression and decompression process in 5G NR shown in FIG. 5 differs from a PDCP data packet compression and decompression process in LTE shown in FIG. 3 in some embodiments such as:

A PDCP layer of 5G NR has a reordering function. A process of decompressing and submitting a PDCP data packet is performed at a last operation of sending the PDCP data packet to an upper layer of the PDCP layer, that is, the PDCP data packet is decompressed before the PDCP data packet is sorted and submitted to the upper layer.

To reduce a data packet processing delay in 5G NR, the PDCP layer in the electronic device may further perform preprocessing. In some embodiments, when a bottom layer does not allocate an air interface grant, the PDCP layer sends PDCP data packets to the lower RLC layer for advance processing. Therefore, only the packet 1 in the PDCP data packets may be transmitted through the air interface, but the PDCP data packets 2, 3, 4, 5, 6, 7, and 8 are processed at the PDCP layer, and are submitted to the RLC layer for further preprocessing.

Figure 6:
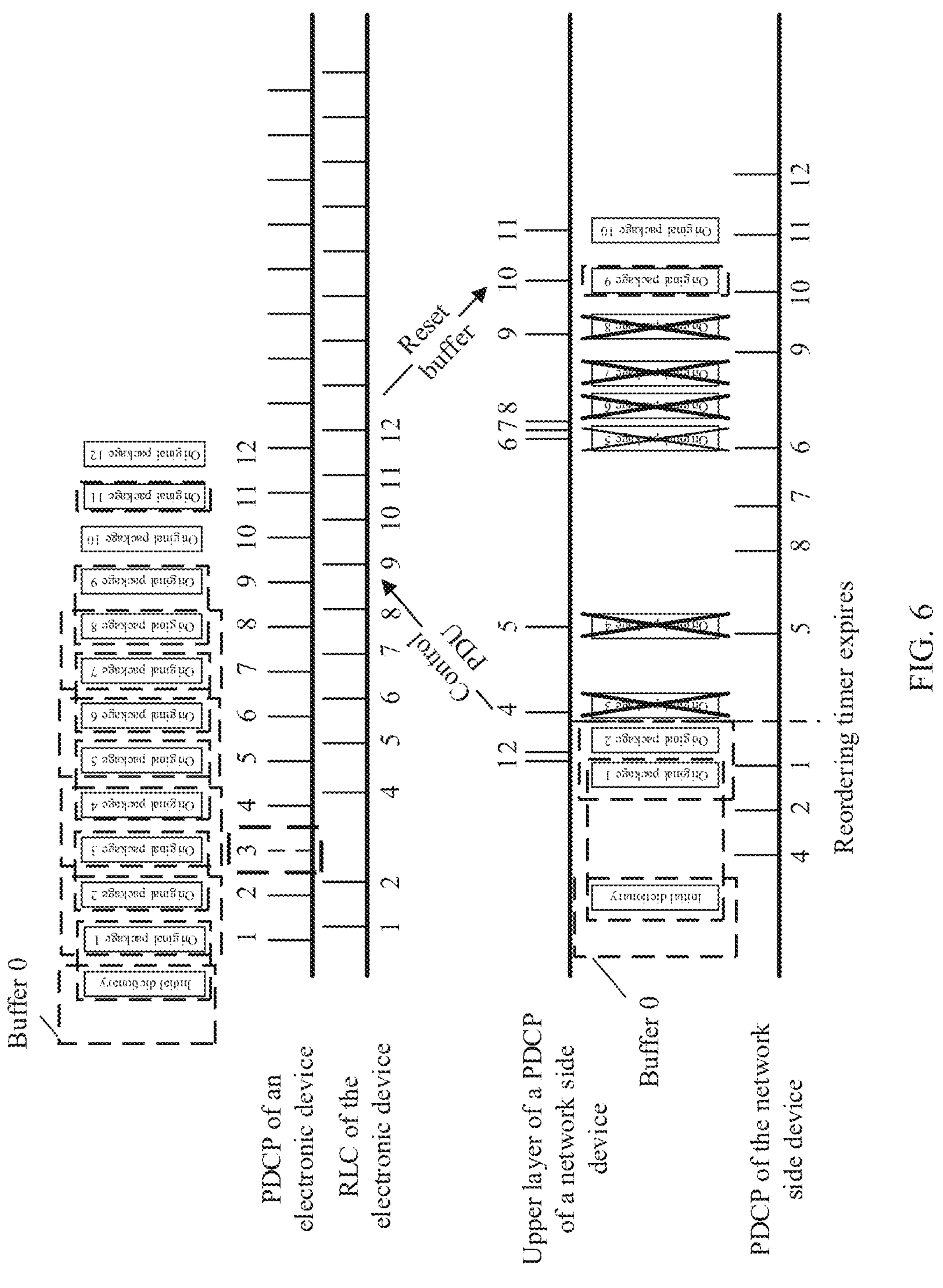
FIG. 6 is an example diagram of a processing procedure of a PDCP data packet decompression failure when a UDC technology is used in 5G NR.

In 5G NR, in a case similar to that in LTE, if an electronic device deletes some PDCP data packets at the PDCP layer due to a PDCP discard timer expiration, a similar batch packet loss event also occurs. In addition, because the PDCP layer in the network side device needs to reorder the PDCP data packets, a reordering timer is started to wait for a PDCP data packet that does not arrive. Therefore, decompression of a PDCP data packet after the PDCP data packet that does not arrive in an SN-based sorting sequence can be performed only after the reordering timer expires. Only in this case, can the network side device find that a problem occurs in decompression of the PDCP data packet after the PDCP data packet that does not arrive, and feed back the problem to the electronic device. In addition, because the PDCP layer in the electronic device has a preprocessing function, more PDCP data packets are compressed based on unaligned buffers and transmitted to the network side device. The foregoing two reasons directly cause more data packet decompression failures. In other words, more PDCP data packets are lost when a batch packet loss event occurs in 5G NR. For example, as shown in FIG. 6, after the PDCP data packet 3 is discarded due to an expiration, the PDCP data packets 4, 5, 6, 7, 8, and 9 are packed, and transmitted to the RLC layer due to the preprocessing function. Even if the PDCP data packets 4, 5, 6, 7, 8, and 9 are normally sent, the PDCP data packets cannot be correctly decompressed by the network side device. In addition, in the network side device, the network side device delivers the PDCP data packet 4 to the upper layer only after the reordering timer expires, and only in this case, can the network side device find that the decompression of the PDCP data packet 4 fails. Compared with the same case in LTE, a time when the network side device finds that the decompression of the PDCP data packet 4 fails is delayed by duration of the reordering timer. When the electronic device receives feedback of a decompression error of the network side device for the PDCP data packet 4, the PDCP data packets 5 and 6 may be sent already, and the PDCP data packet 7, 8, and 9 are transmitted to the RLC layer, the buffer can be reset only from a PDCP data packet 10. The network side device can normally decompress a PDCP data packet and send the PDCP data packet to the upper layer of the PDCP layer only after receiving the PDCP data packet 10. Therefore, because the PDCP layer has the preprocessing function and a problem can be detected in the PDCP layer reordering procedure only after the reordering timer expires, a quantity of lost PDCP data packets in 5G NR may be larger than that in LTE when PDCP data packet decompression fails, causing a more serious waste on data processing resources and uplink data transmission resources of the electronic device and the network side device.

Therefore, this application provides a data packet decompression method, an electronic device, and a network side device, to reduce a resource waste caused by a PDCP data packet decompression failure.

The data packet decompression method in embodiments of this application is applicable to an AM mode and an unacknowledged mode (UM) of LTE, and is also applicable to an AM mode and a UM mode of 5G NR.

In the data packet decompression method in embodiments of this application, the electronic device numbers a maintained compression buffer, the network side device numbers a maintained decompression buffer, and a number of a compression buffer used when the electronic device compresses a PDCP data packet is the same as a number of a decompression buffer used when the network side device decompresses the PDCP data packet. In some embodiments, an SN of the PDCP data packet may be used as a number for the compression buffer and the decompression buffer that are generated based on the PDCP data packet, so that different buffers can be distinguished, and the PDCP data packet, the compression buffer, and the decompression buffer can be effectively associated. Specifically, for an original data packet n, the electronic device performs compression processing on the original data packet n based on a compression buffer (n−1), to generate a PDCP data packet n corresponding to the original data packet n, and updates the compression buffer (n−1) to a new compression buffer (n) based on the original data packet n. In some embodiments, a number of the new compression buffer (n) may be an SN of the PDCP data packet n. Correspondingly, for the PDCP data packet n, the network side device decompresses the PDCP data packet n by using a current decompression buffer (n−1), to generate the original data packet n corresponding to the PDCP data packet n, and updates the decompression buffer (n−1) to a new decompression buffer (n) based on the original data packet n. In some embodiments, a number of the new decompression buffer (n) may be the SN of the PDCP data packet n.

For example, FIG. 7 is an example diagram of a relationship between buffers and PDCP data packets maintained in the electronic device and the network side device. It is assumed that a buffer that includes a preset dictionary or an initial dictionary in each of the electronic device and the network side device is a buffer 0. In the electronic device, a PDCP data packet 1 is obtained by compressing an original data packet 1 by using the buffer 0, and the buffer 0 is updated based on the original data packet 1 of the PDCP data packet 1, to obtain a buffer 1 (that is, the buffer 1 is generated based on the PDCP data packet 1); a PDCP data packet 2 is obtained by compressing an original data packet 2 by using the buffer 1, and the buffer 1 is updated based on the original data packet 2 of the PDCP data packet 2, to obtain a buffer 2; a PDCP data packet 3 is obtained by compressing an original data packet 3 by using the buffer 2, and the buffer 2 is updated based on the original data packet 3 of the PDCP data packet 3, to obtain a buffer 3; and the rest may be deduced by analogy. In the network side device, the PDCP data packet 1 is decompressed based on the buffer 0 to obtain the original data packet 1, and the buffer 0 is updated based on the original data packet 1, to obtain the buffer 1 (that is, the buffer 1 is generated based on the PDCP data packet 1); the PDCP data packet 2 is decompressed based on the buffer 1 to obtain the original data packet 2, and the buffer 1 is updated based on the original data packet 2, to obtain the buffer 2; the PDCP data packet 3 is decompressed based on the buffer 2 to obtain the original data packet 3, and the buffer 2 is updated based on the original data packet 3, to obtain the buffer 3; and the rest may be deduced by analogy. In FIG. 7, compression or decompression of a same PDCP data packet in the electronic device and the network side device is based on a same buffer. Numbers 0 to 5 of the PDCP data packets and the buffers in FIG. 7 are merely examples, and are not intended to limit a numbering manner of the buffers.

Based on the foregoing numbers of the buffers, as shown in FIG. 8, an embodiment of the data packet decompression method may include the following operations.

Operation 801: A network side device receives a PDCP data packet, and determines whether the PDCP data packet is successfully decompressed.

In some embodiments, determining whether the PDCP data packet is successfully decompressed may include: determining whether a checksum of the PDCP data packet is correct.

The checksum is a 4-bit value obtained through calculation based on a buffer used for PDCP data packet compression, and is placed at an end of the PDCP data packet. The network side device may obtain a checksum through calculation based on a decompression buffer to be used for PDCP data packet decompression. Whether the checksum of the PDCP data packet is correct may be determined by comparing whether the checksum obtained by the network side device through calculation is consistent with the checksum carried in the PDCP data packet. If the checksum obtained by the network side device through calculation is consistent with the checksum carried in the PDCP data packet, it is determined that the checksum of the PDCP data packet is correct, and it indicates that the decompression buffer used for the PDCP data packet decompression is the same as the compression buffer used when the electronic device generates the PDCP data packet, and indicates that the PDCP data packet can be decompressed successfully. On the contrary, if the checksum obtained by the network side device through calculation is inconsistent with the checksum carried in the PDCP data packet, it is determined that the checksum of the PDCP data packet is incorrect, and it indicates that the PDCP data packet fails to be decompressed.

For example, it is assumed that a PDCP data packet 2 is not received. In this case, a number of the decompression buffer in the network side device is 1 (namely, a buffer 1), and a PDCP data packet that needs to be decompressed is a packet 3. A checksum carried in the PDCP data packet 3 is obtained by the electronic device through calculation based on a compression buffer whose number is 2 (namely, a buffer 2), and the network side device calculates a checksum based on the decompression buffer whose number is 1. The compression buffer whose number is 2 is different from the decompression buffer whose number is 1. Therefore, the checksums are inconsistent through comparison, and it can be determined that the checksum of the PDCP data packet 3 is incorrect, and the PDCP data packet fails to be decompressed.

When a determining result in this operation is that the PDCP data packet is successfully decompressed, the network side device continues to determine whether a next PDCP data packet is successfully decompressed. Details are not described herein again.

Operation 802: If a determining result of the network side device is that the PDCP data packet fails to be decompressed, the network side device determines a buffer identifier corresponding to the PDCP data packet and a number of a decompression buffer used for decompression, and sends the buffer identifier to the electronic device; and the electronic device receives the buffer identifier, and sends data in a compression buffer corresponding to the buffer identifier to the network side device.

In some embodiments, the buffer identifier may be sent to the electronic device by using a control PDU.

In some embodiments, the compression buffer may be sent to the network side device by using a control PDU.

The buffer identifier is used to indicate, to the electronic device, a compression buffer used for generating an $N^{th}$ PDCP data packet. In some embodiments, the buffer identifier may be an identifier of a decompression buffer used for decompressing the PDCP data packet, or an identifier of a compression buffer used for generating the PDCP data packet, or an identifier of a decompression buffer that is updated based on an original data packet of the PDCP data packet, or an identifier of a compression buffer that is updated based on the original data packet of the PDCP data packet. In some embodiments, the identifier of the decompression buffer may be a number of the decompression buffer, and the identifier of the compression buffer may be a number of the compression buffer.

In some embodiments, the compression buffer and the decompression buffer may be numbered by using an SN of the PDCP data packet. For example, the number of the compression buffer or the decompression buffer that is updated based on the original data packet of the PDCP data packet is set to an SN. In this case, the SN is the number of the compression buffer or the decompression buffer that is updated based on the original data packet of the PDCP data packet. The number of the compression buffer used for generating the PDCP data packet is a value of the SN minus 1, and the number of the decompression buffer used for decompressing the PDCP data packet is also the value of the SN minus 1. For example, it is assumed that an SN of a PDCP data packet is m. In this case, a number of a compression buffer for generating the PDCP data packet is m−1, and a number of a compression buffer that is updated based on an original data packet of the PDCP data packet is m. Similarly, a number of a decompression buffer used for decompressing the PDCP data packet is m−1, and a number of a decompression buffer that is updated based on the original data packet of the PDCP data packet is m. Based on the foregoing buffer numbering manner, in some embodiments, the network side device may obtain the SN from a header of the PDCP data packet, and send the SN as the buffer identifier to the electronic device. Herein, the SN sent as the buffer identifier is the identifier of the compression buffer or the decompression buffer updated based on the original data packet of the PDCP data packet. In some embodiments, the network side device may alternatively obtain, through calculation based on an SN value m obtained from the header of the PDCP data packet, that the number of the decompression buffer used for decompressing the PDCP data packet is m−1, and send the number m−1 as the buffer identifier to the electronic device.

The example in operation 801 is continued. As shown in FIG. 9, the network side device fails to decompress the PDCP data packet 3, and the network side device may obtain an SN of the PDCP data packet 3. It is assumed that the SN is 3.

In some embodiments, the network side device may send the value 3 of the SN to the electronic device. Correspondingly, the electronic device obtains, through calculation based on the value of the SN, that the number that is of the decompression buffer and that is sent by the network side device is 2 (that is, 3−1), and sends data in the compression buffer whose number is 2 (namely, the compression buffer corresponding to the number of the decompression buffer) in the electronic device to the network side device.

In some embodiments, the network side device may obtain, through calculation based on the value 3 of the SN, that the number of the decompression buffer used by the network side device to decompress the PDCP data packet 3 is 2, and the network side device may send the number 2 to the electronic device. Correspondingly, the electronic device sends the data in the compression buffer whose number is 2

(namely, the compression buffer corresponding to the number of the decompression buffer) in the electronic device to the network side device.

Operation 803: The network side device receives the data in the compression buffer, updates the decompression buffer by using the received data in the compression buffer, decompresses the PDCP data packet based on an updated decompression buffer to obtain the original data packet corresponding to the PDCP data packet, and updates the decompression buffer based on the original data packet.

Then, the network side device may continue, based on the updated decompression buffer, to decompress PDCP data packets subsequent to the PDCP data packet. Details are not described herein again.

The example in operation 802 is continued. As shown in FIG. 9, the network side device receives data in the buffer 2, updates the decompression buffer of the PDCP data packet by using the data in the buffer 2, where a number of the updated decompression buffer is also 2, decompresses the PDCP data packet 3 based on the decompression buffer 2 to obtain an original data packet 3 of the PDCP data packet 3, and updates the decompression buffer whose number is 2 by using the obtained original data packet 3 to obtain a decompression buffer whose number is 3.

Because a compression buffer and a decompression buffer with a same number are the same, the network side device updates the received buffer to the decompression buffer of the PDCP data packet, and decompresses the PDCP data packet based on the updated decompression buffer, to obtain the original data packet corresponding to the PDCP data packet. In this way, the decompression buffer required by the PDCP data packet that fails to be decompressed is obtained from the electronic device, to ensure that the PDCP data packet that fails to be decompressed can be successfully decompressed, and resolve a problem of a resource waste caused by the network side device failing to decompress the PDCP data packet in the conventional technology.

In some embodiments, to prevent an excessively large amount of compression buffer data sent to the network side device, a maximum threshold may be preset in the electronic device. A value of the maximum threshold is not limited in this embodiment of this application. Correspondingly, in operation 802, after receiving the buffer identifier, the electronic device may first determine whether a size of the compression buffer corresponding to the buffer identifier exceeds the preset maximum threshold. If the size of the compression buffer does not exceed the maximum threshold, the electronic device sends the data in the compression buffer corresponding to the buffer identifier to the network side device; or if the size of the compression buffer exceeds the maximum threshold, the electronic device may indicate the network side device to perform a buffer resetting procedure according to the conventional technology. For example, the electronic device may send a buffer resetting notification to the network side device. In some embodiments, the buffer resetting notification may be sent to the network side device by using a control PDU. In a buffer resetting procedure of the electronic device, the electronic device initializes the maintained compression buffer, and then the electronic device compresses, by using the initialized compression buffer, an original data packet that currently needs to be compressed, generates a corresponding PDCP data packet, and transmits the PDCP data packet to the network side device. In the buffer resetting procedure of the network side device, the network side device initializes a maintained decompression buffer, and the network side device decompresses a newly received PDCP data packet by using the initialized decompression buffer until the newly received PDCP data packet is successfully decompressed.

The example shown in FIG. 9 is continued. It is assumed that the electronic device compresses an original data packet 6 and obtains a PDCP data packet 6 before receiving the buffer identifier, and the network side device receives the PDCP data packet 5 already. After the electronic device receives the buffer identifier, a compression buffer corresponding to the buffer identifier is the buffer 2. If a size of the buffer 2 does not exceed the maximum threshold, the electronic device sends data in the buffer 2 to the network side device; or if a size of the buffer 2 exceeds the maximum threshold, the electronic device indicates the network side device to reset the buffer. The electronic device and the network side device separately execute the buffer resetting procedure, and initialize the maintained buffer. The electronic device compresses, by using the initialized compression buffer, an original data packet 7 that needs to be compressed, to generate a PDCP data packet 7, and transmits the PDCP data packet 7 to the network side device. Correspondingly, the network side device sequentially decompresses the newly received PDCP data packet 6 and PDCP data packet 7 by using the initialized decompression buffer, and the PDCP data packet 7 is decompressed successfully. Then, the decompression buffer is updated based on the original data packet 7 obtained by decompressing the PDCP data packet 7, and a received PDCP data packet 8 and a subsequent PDCP data packet are processed according to operation 801. Details are not described herein again.

Figure 10:
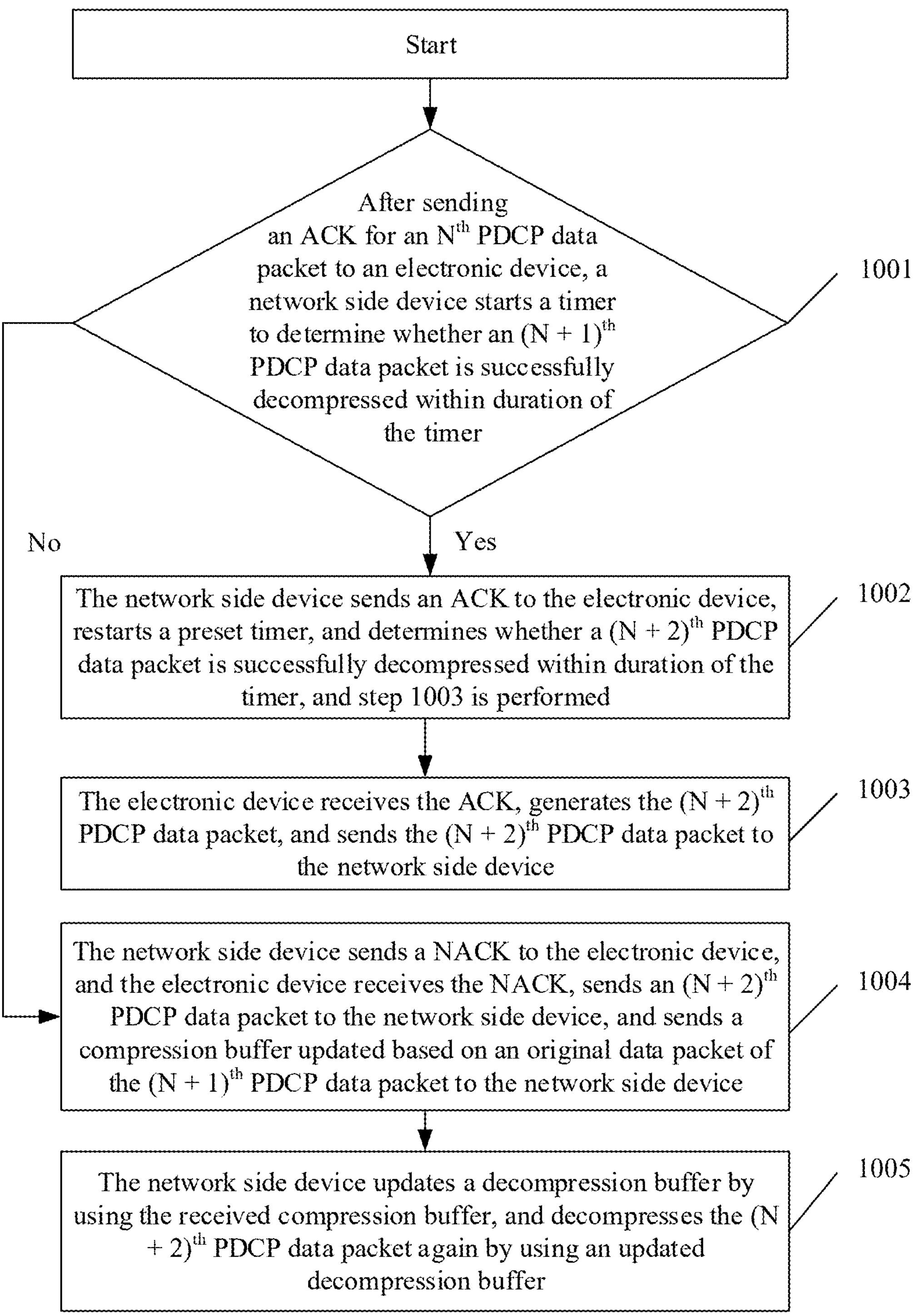
FIG. 10 is a flowchart of another embodiment of a data packet decompression method according to an embodiment of this application.

As shown in FIG. 10, another embodiment of the data packet decompression method may include the following operations.

Operation 1001: After a network side device sends an acknowledgment (ACK) for an $N^{th}$ PDCP data packet to an electronic device, the electronic device receives the ACK, generates an $(N+1)^{th}$ PDCP data packet, sends the $(N+1)^{th}$ PDCP data packet to the network side device, and waits for the network side device to feed back an ACK or a negative acknowledgment (NACK); the network side device starts a preset timer to determine whether the $(N+1)^{th}$ PDCP data packet is successfully decompressed within duration of the timer; and if the network side device determines that the $(N+1)^{th}$ PDCP data packet is successfully decompressed, operation 1002 is performed; or if the network side device determines that the $(N+1)^{th}$ PDCP data packet is not successfully decompressed, operation 1004 is performed.

N is a natural number.

Figure 11:
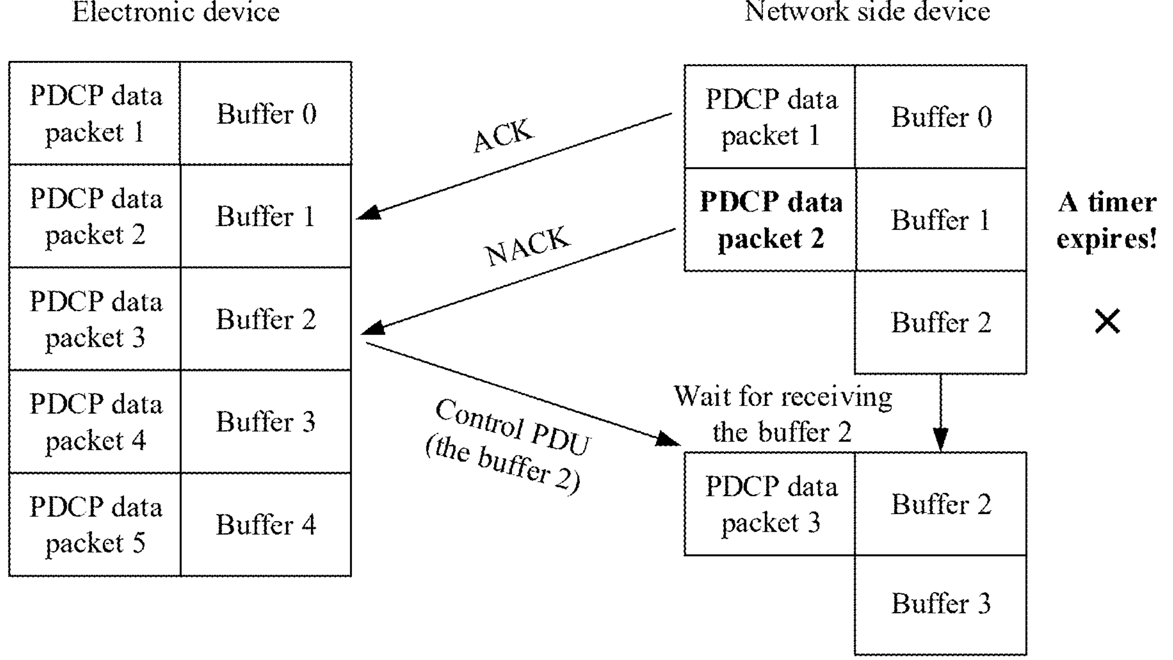
FIG. 11 is an example diagram of the data packet decompression method shown in FIG. 10.

For example, as shown in FIG. 11, a PDCP data packet 1 (namely, the $N^{th}$ PDCP data packet) is successfully decompressed within duration of a timer for the PDCP data packet 1, and the network side device sends the ACK to the electronic device. Then, the electronic device receives the ACK, generates a PDCP data packet 2, sends the PDCP data packet 2 to the network side device, and waits for the network side device to feed back an ACK or an NACK. The network side device starts the preset timer (a timer for the PDCP data packet 2), to determine whether the PDCP data packet 2 (namely, the $(N+1)^{th}$ PDCP data packet) is successfully decompressed within duration of the timer. If a determining result is that the PDCP data packet 2 is successfully decompressed, operation 1002 is performed. In FIG. 11, for example, the PDCP data packet 2 is lost. In this case, the network side device cannot successfully decompress the PDCP data packet 2 within the duration of the timer. Therefore, it is determined that the PDCP data packet 2 fails to be decompressed, and operation 1004 is performed.

It should be noted that, for a first PDCP data packet, a timer for the first PDCP data packet may be started after a bearer is successfully established between the network side device and the electronic device. For the $N^{th}$ PDCP data packet, where N is greater than or equal to 2, a timer for the $N^{th}$ PDCP data packet may be started after the network side device sends an ACK or an NACK for the $(N-1)^{th}$ PDCP data packet to the electronic device.

Operation 1002: The network side device sends the ACK to the electronic device, restarts the preset timer, and determines whether an $(N+2)^{th}$ PDCP data packet is successfully decompressed within the duration of the timer, and operation 1003 is performed.

For processing of a determining result by the network side device in operation 1002, refer to operation 1001. Details are not described herein again.

The example in operation 1001 is continued. If the PDCP data packet 2 is successfully decompressed, the network side device sends an ACK to the electronic device, restarts the preset timer, determines whether a PDCP data packet 3 is successfully decompressed (that is, the $(N+2)^{th}$ PDCP data packet is successfully decompressed) within the duration of the timer, and performs operation 1003. For subsequent processing of the determining result, refer to operation 1001, and details are not described herein again.

Operation 1003: The electronic device receives the ACK, generates the $(N+2)^{th}$ PDCP data packet, and sends the $(N+2)^{th}$ PDCP data packet to the network side device.

For subsequent processing after the network side device receives the $(N+2)^{th}$ PDCP data packet, refer to operation 1002. Details are not described herein again.

Operation 1004: The network side device sends the NACK to the electronic device, and the electronic device receives the NACK, sends an $(N+2)^{th}$ PDCP data packet to the network side device, sends data in a compression buffer used for generating the $(N+2)^{th}$ PDCP data packet (namely, a next PDCP data packet of the $(N+1)^{th}$ PDCP data packet) to the network side device, and performs operation 1005.

In some embodiments, the compression buffer may be sent to the network side device by using a control PDU.

An example in operation 1001 is continued. As shown in FIG. 11, the electronic device receives the NACK sent by the network side device, and sends, to the network side device, the data in the buffer 2 used for generating the next PDCP data packet 3 of the PDCP data packet 2.

Operation 1005: The network side device updates the decompression buffer by using the data in the received compression buffer, and decompresses the received $(N+2)^{th}$ PDCP data packet by using an updated decompression buffer.

A meaning of performing operation 1004 and operation 1005 is as follows: If the $(N+1)^{th}$ PDCP data packet fails to be decompressed, it needs to be ensured that the $(N+2)^{th}$ PDCP data packet is successfully decompressed, and it further needs to be ensured that more subsequent PDCP data packets are successfully decompressed. Therefore, the data in the compression buffer used for generating the $(N+2)^{th}$ PDCP data packet needs to be sent to the network side device, and the network side device updates the decompression buffer, and decompresses the $(N+2)^{th}$ PDCP data packet. In this case, the $(N+1)^{th}$ PDCP data packet is discarded, but the network device successfully decompresses the $(N+2)^{th}$ PDCP data packet. Then, the preset timer is started, to continue to determine whether the $(N+3)^{th}$ PDCP data packet is successfully decompressed within the duration of the timer. Details are not described subsequently.

In some embodiments, to prevent an excessively large amount of compression buffer data sent to the network side device, a maximum threshold may be preset in the electronic device. A range of the maximum threshold is not limited in this embodiment of this application. Correspondingly, in operation 1004, after receiving the NACK, the electronic device may first determine whether a size of the compression buffer used for generating the $(N+2)^{th}$ PDCP data packet exceeds the preset maximum threshold. If the size does not exceed the maximum threshold, the electronic device sends, to the network side device, data in the compression buffer used for generating the $(N+2)^{th}$ PDCP data packet; or if the size exceeds the maximum threshold, the electronic device may perform a buffer resetting procedure according to the conventional technology. The electronic device and the network side device separately initialize a maintained buffer. Then, the electronic device re-compresses a corresponding original data packet based on a reset buffer, generates the $(N+2)^{th}$ PDCP data packet, and transmits the $(N+2)^{th}$ PDCP data packet to the network side device. In this case, for processing after the network side device successfully decompresses the $(N+2)^{th}$ PDCP data packet, refer to operation 1001. Details are not described herein again.

Figure 12:
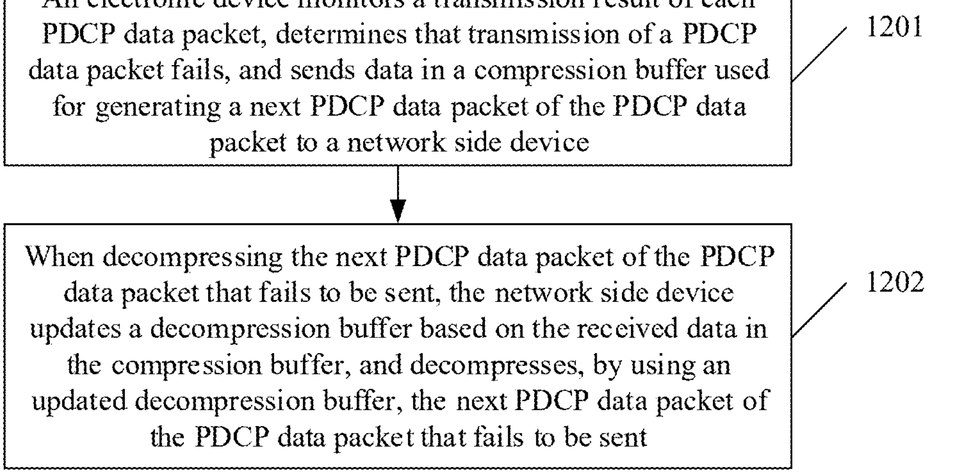
FIG. 12 is a flowchart of still another embodiment of a data packet decompression method according to an embodiment of this application.

As shown in FIG. 12, still another embodiment of the data packet decompression method may include the following operations.

Operation 1201: An electronic device monitors a transmission result of each PDCP data packet, determines that transmission of a PDCP data packet fails, and sends data in a compression buffer used for generating a next PDCP data packet of the PDCP data packet to a network side device.

In some embodiments, that the electronic device monitors the transmission result of each PDCP data packet may include: The electronic device detects a transmission result of a MAC packet corresponding to each PDCP data packet. Correspondingly, when it is detected that a transmission result of at least one MAC packet corresponding to one PDCP data packet is a transmission failure, the electronic device determines that the transmission of the PDCP data packet fails.

A PDCP data packet is transmitted from a PDCP layer to an RLC layer. An RLC header is added to the PDCP data packet at the RLC layer to obtain an RLC data packet, and the RLC data packet is transmitted to a MAC layer. At the MAC layer, after the RLC data packet is fragmented, several MAC packets are obtained, and the several obtained MAC packets are MAC packets corresponding to the PDCP data packet in this operation. The MAC packets may be transmitted in a HARQ manner. In this case, monitoring whether a transmission result of a MAC packet is successful or unsuccessful may be implemented by monitoring a quantity of retransmissions of the MAC packet. For example, a quantity threshold may be preset. If the quantity of retransmissions of the MAC packet reaches the preset quantity threshold, it may be determined that the MAC packet transmission fails; or if the quantity of retransmissions of the MAC packet does not reach the preset quantity threshold, it is determined that the MAC packet transmission succeeds. A value of the quantity-of-times threshold is not limited in this embodiment of this application. In some embodiments, when the MAC packet is transmitted in the HARQ manner, the network side device may feed back an NACK of the MAC packet to the electronic device, to indicate to the electronic device that the network side device fails to receive the MAC packet. In other words, when the electronic device transmits a MAC packet to the network side device, if the electronic device receives an NACK of the network side device for the MAC packet, the electronic device may determine that the current transmission of the MAC packet fails.

In some embodiments, the electronic device may send the data in the compression buffer to the network side device by using a control PDU.

Operation 1202: When decompressing the next PDCP data packet of the PDCP data packet that fails to be sent, the network side device updates a decompression buffer based on the received data in the compression buffer, and decompresses, by using an updated decompression buffer, the next PDCP data packet of the PDCP data packet that fails to be sent.

Figure 13:
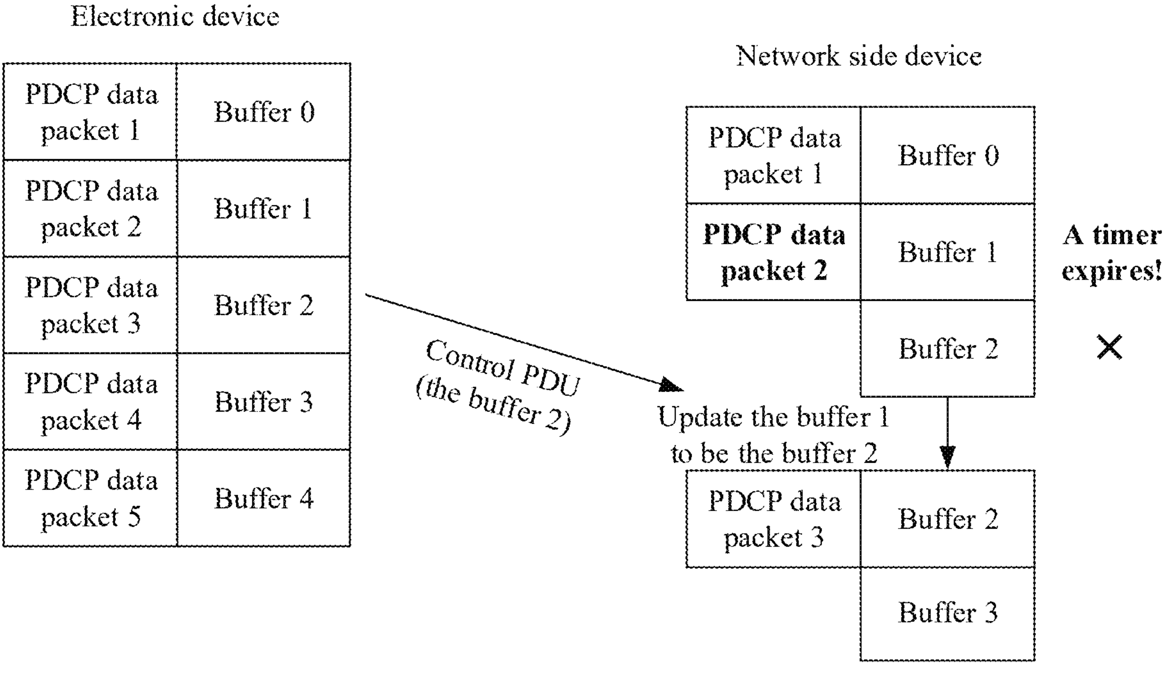
FIG. 13 is an example diagram of the data packet decompression method shown in FIG. 12.

For example, as shown in FIG. 13, the electronic device detects that a PDCP data packet 2 fails to be sent, and sends, to the network side device, data in a buffer 2 used for generating a PDCP data packet 3. When decompressing the PDCP data packet 3, the network side device updates a decompression buffer (that is, a buffer 1) based on the received data in the buffer 2. An updated decompression buffer is also the buffer 2, and the PDCP data packet 3 is decompressed by using the buffer 2.

In some embodiments, to prevent an excessively large amount of compression buffer data sent to the network side device, a maximum threshold may be preset in the electronic device. A value of the maximum threshold is not limited in this embodiment of this application. Correspondingly, in operation 1201, after failing to send the PDCP data packet, the electronic device may first determine whether a size of a compression buffer used for generating a next PDCP data packet of the PDCP data packet exceeds the preset maximum threshold. If the size of the compression buffer does not exceed the maximum threshold, the electronic device sends, to the network side device, data in the compression buffer used for generating the next PDCP data packet of the PDCP data packet; or if the size of the compression buffer exceeds the maximum threshold, the electronic device may indicate the network side device to perform a buffer resetting procedure in the conventional technology, for example, the electronic device may send a buffer resetting notification to the network side device. In some embodiments, the buffer resetting notification may be sent to the network side device by using a control PDU. In a buffer resetting procedure of the electronic device, the electronic device initializes the maintained compression buffer, and then the electronic device compresses, by using the initialized compression buffer, an original data packet that currently needs to be compressed, generates a corresponding PDCP data packet, and transmits the PDCP data packet to the network side device. In a buffer resetting procedure of the network side device, the network side device initializes a maintained decompression buffer, and the network side device decompresses a newly received PDCP data packet by using the initialized decompression buffer until the newly received PDCP data packet is successfully decompressed.

In this embodiment, if the electronic device detects that a PDCP data packet fails to be sent, it indicates that the network side device does not receive the PDCP data packet. In this case, it needs to be ensured that the network side device can successfully decompress a next PDCP data packet of the PDCP data packet, to ensure that more subsequent PDCP data packets are successfully decompressed. Therefore, data in the compression buffer used for generating a next PDCP data packet of the PDCP data packet needs to be sent to the network side device, and the network side device updates the decompression buffer, and decompresses the next PDCP data packet of the PDCP data packet. In this case, the PDCP data packet is discarded. However, the network side device successfully decompresses the next PDCP data packet of the PDCP data packet, to resolve a problem that is in the conventional technology and that a large quantity of PDCP data packets are lost because a PDCP data packet fails to be sent, and reduce resource waste caused by a PDCP data packet decompression failure.

Figure 14:
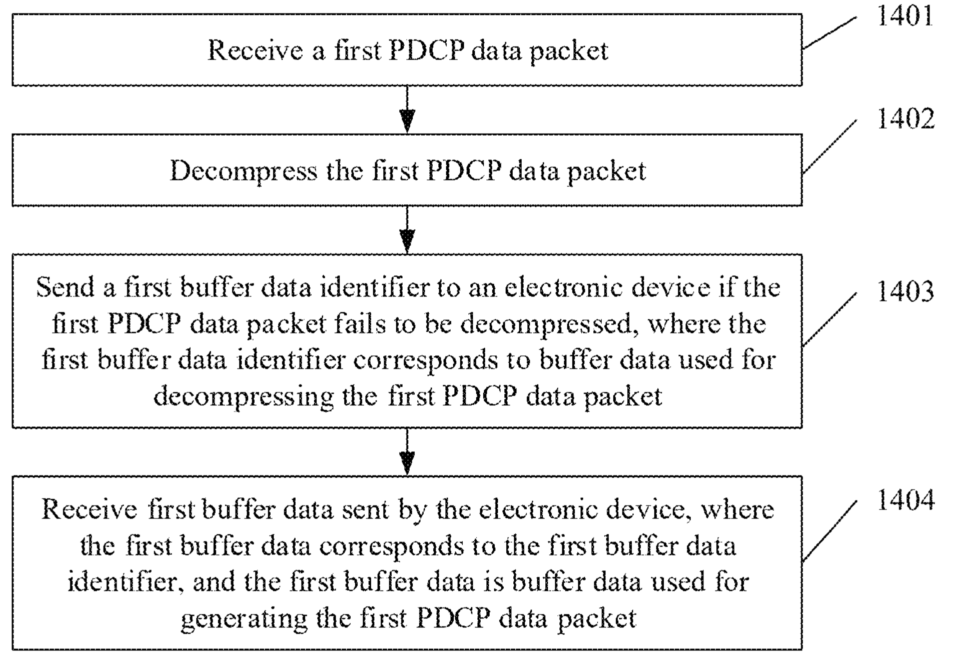
FIG. 14 is a flowchart of still another embodiment of a data packet decompression method according to an embodiment of this application.

FIG. 14 is a flowchart of still another embodiment of the data packet decompression method according to this application. The method may be applied to a network side device. As shown in FIG. 14, the method may include the following operations.

Operation 1401: Receive a first PDCP data packet.

Operation 1402: Decompress the first PDCP data packet.

Operation 1403: Send a first buffer data identifier to an electronic device if the first PDCP data packet fails to be decompressed, where the first buffer data identifier corresponds to buffer data used for decompressing the first PDCP data packet.

In some embodiments, buffer data used for decompressing the first PDCP data packet may be data in the decompression buffer described in the foregoing embodiment.

In some embodiments, the first buffer data identifier may be an identifier of the foregoing decompression buffer. The first buffer data identifier may be: an identifier of a decompression buffer used for decompressing the first PDCP data packet, or an identifier of a decompression buffer that is updated based on an original data packet of the first PDCP data packet, or an identifier of a compression buffer used for generating the first PDCP data packet, or an identifier of a compression buffer that is updated based on the original data packet of the first PDCP data packet.

Operation 1404: Receive first buffer data sent by the electronic device, where the first buffer data corresponds to the first buffer data identifier, and the first buffer data is buffer data used for generating the first PDCP data packet.

In some embodiments, the first buffer data may be data in a compression buffer corresponding to the first buffer data identifier.

In some embodiments, the network side device may receive the first buffer data by using a control PDU.

Operation 1405: Decompress the first PDCP data packet by using the first buffer data.

Figures 15, 16:
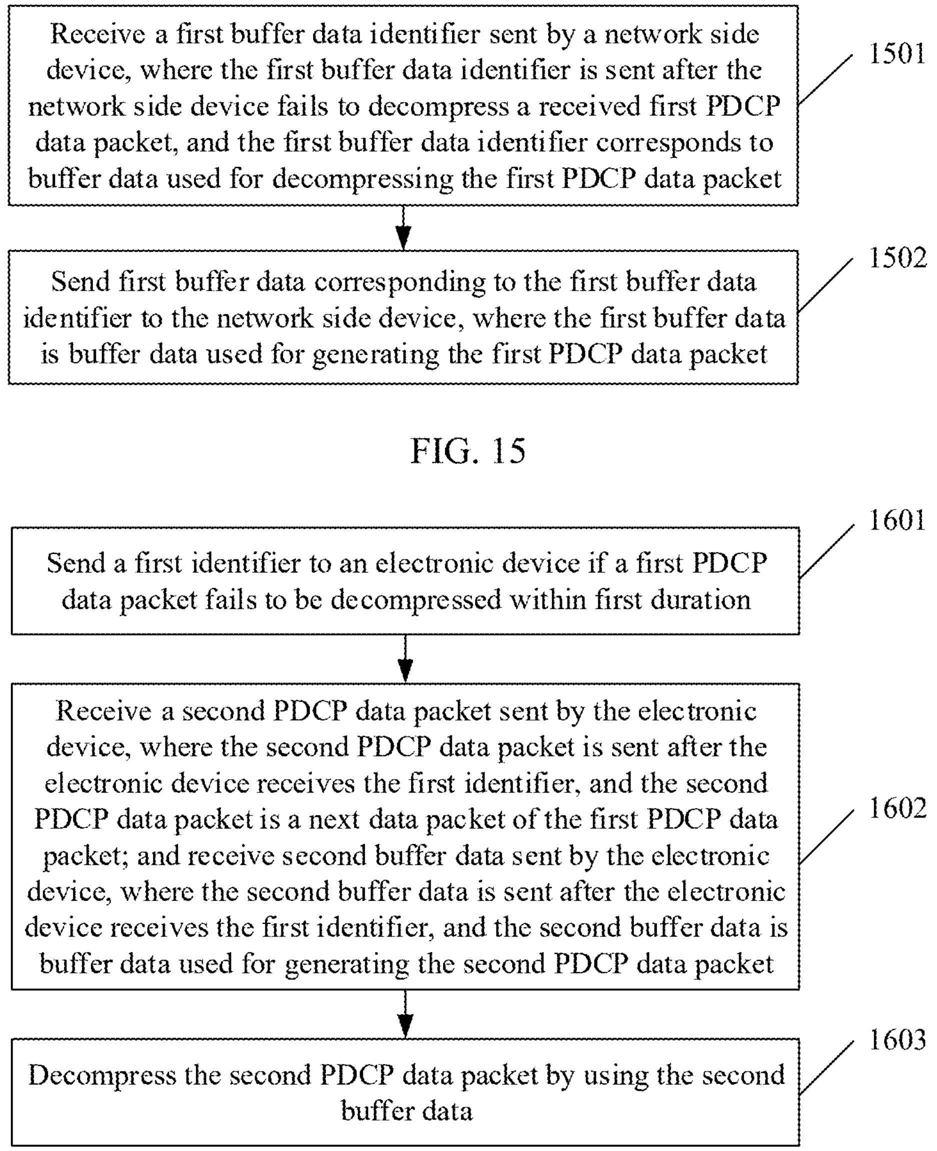
FIG. 15 is a flowchart of still another embodiment of a data packet decompression method according to an embodiment of this application.
FIG. 16 is a flowchart of still another embodiment of a data packet decompression method according to an embodiment of this application.

FIG. 15 is a flowchart of still another embodiment of a data packet decompression method according to this application. The method may be applied to an electronic device. As shown in FIG. 15, the method may include the following operations.

Operation 1501: Receive a first buffer data identifier sent by a network side device, where the first buffer data identifier is sent after the network side device fails to decompress a received first PDCP data packet, and the first buffer data identifier corresponds to buffer data used for decompressing the first PDCP data packet.

Operation 1502: Send first buffer data corresponding to the first buffer data identifier to the network side device, where the first buffer data is buffer data used for generating the first PDCP data packet.

In some embodiments, before operation 1502, the method may further include:

determining that a size of the first buffer data does not exceed a preset maximum threshold.

In some embodiments, the electronic device may send the first buffer data to the network side device by using a control PDU.

For embodiments shown in FIG. 14 and FIG. 15, refer to corresponding descriptions in the embodiment shown in FIG. 8.

FIG. 16 is a flowchart of still another embodiment of the data packet decompression method according to this application. The method may be applied to a network side device. As shown in FIG. 16, the method may include the following operations.

Operation 1601: Send a first identifier to an electronic device if a first PDCP data packet fails to be decompressed within first duration.

In some embodiments, the first identifier may be an NACK.

Operation 1602: Receive a second PDCP data packet sent by the electronic device, where the second PDCP data packet is sent after the electronic device receives the first identifier, and the second PDCP data packet is a next data packet of the first PDCP data packet; and receive second buffer data sent by the electronic device, where the second buffer data is sent after the electronic device receives the first identifier, and the second buffer data is buffer data used by the electronic device to generate the second PDCP data packet.

In some embodiments, the second buffer data may be data in a compression buffer used by the electronic device to generate the second PDCP data packet.

In some embodiments, the network side device may receive the second buffer data by using a control PDU.

Operation 1603: Decompress the second PDCP data packet by using the second buffer data.

Figure 17:
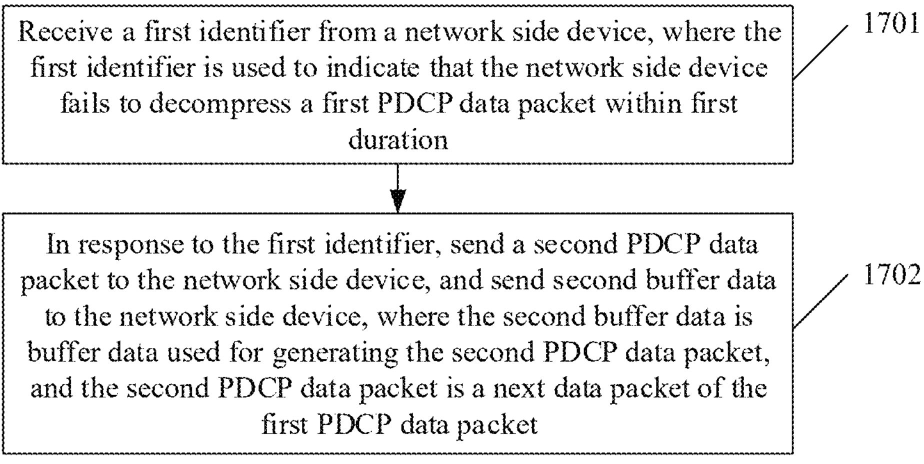
FIG. 17 is a flowchart of still another embodiment of a data packet decompression method according to an embodiment of this application.

FIG. 17 is a flowchart of still another embodiment of the data packet decompression method according to this application. The method may be applied to an electronic device. As shown in FIG. 17, the method may include the following operations.

Operation 1701: Receive a first identifier from a network side device, where the first identifier is used to indicate that the network side device fails to decompress a first PDCP data packet within first duration.

Operation 1702: In response to the first identifier, send a second PDCP data packet to the network side device, and send second buffer data to the network side device, where the second buffer data is buffer data used by the electronic device to generate the second PDCP data packet, and the second PDCP data packet is a next data packet of the first PDCP data packet.

In some embodiments, before operation 1702, the method may further include:

determining that a size of the second buffer data does not exceed a preset maximum threshold.

In some embodiments, the second buffer data may be sent to the network side device by using a control PDU.

For embodiments shown in FIG. 16 and FIG. 17, refer to corresponding descriptions in the embodiment shown in FIG. 10.

Figure 18:
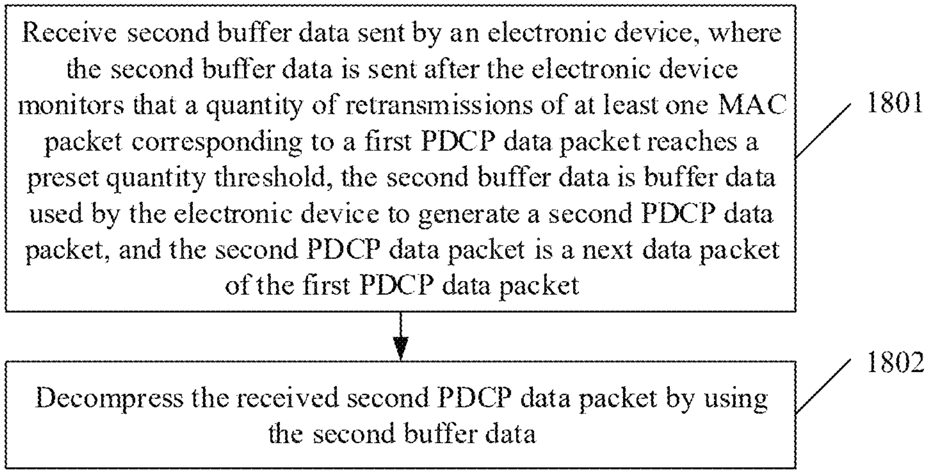
FIG. 18 is a flowchart of still another embodiment of a data packet decompression method according to an embodiment of this application.

FIG. 18 is a flowchart of still another embodiment of the data packet decompression method according to this application. The method may be applied to a network side device. As shown in FIG. 18, the method may include the following operations.

Operation 1801: Receive second buffer data sent by an electronic device, where the second buffer data is sent after the electronic device detects that a quantity of retransmissions of at least one MAC packet corresponding to a first PDCP data packet reaches a preset quantity threshold, the second buffer data is buffer data used by the electronic device to generate a second PDCP data packet, and the second PDCP data packet is a next data packet of the first PDCP data packet.

In some embodiments, the second buffer data may be data in a compression buffer used by the electronic device to generate the second PDCP data packet.

Operation 1802: Decompress the received second PDCP data packet by using the second buffer data.

In some embodiments, the network side device may receive the second buffer data by using a control PDU.

Figure 19:
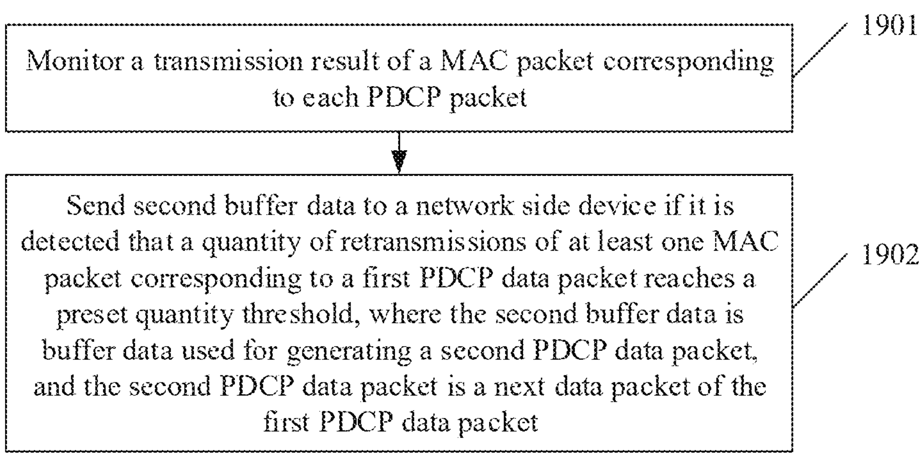
FIG. 19 is a flowchart of still another embodiment of a data packet decompression method according to an embodiment of this application.

FIG. 19 is a flowchart of still another embodiment of the data packet decompression method according to this application. The method may be applied to an electronic device. As shown in FIG. 19, the method may include the following operations.

Operation 1901: Monitor a transmission result of a MAC packet corresponding to each PDCP data packet.

Operation 1902: Send second buffer data to a network side device if it is detected that a quantity of retransmissions of at least one MAC packet corresponding to a first PDCP data packet reaches a preset quantity threshold, where the second buffer data is buffer data used by the electronic device to generate a second PDCP data packet, and the second PDCP data packet is a next data packet of the first PDCP data packet.

In some embodiments, before the second buffer data is sent to the network side device in operation 1902, the method may further include:

determining that a size of the second buffer data does not exceed a preset maximum threshold.

In some embodiments, the second buffer data may be sent to the network side device by using a control PDU.

For embodiments shown in FIG. 18 and FIG. 19, refer to corresponding descriptions in the embodiment shown in FIG. 12.

It may be understood that some or all of the operations or operations in the foregoing embodiments are merely examples. In embodiments of this application, other operations or variations of various operations may be further performed. In addition, the operations may be performed in a sequence different from that presented in the foregoing embodiments, and not all operations in the foregoing embodiments may need to be performed.

Figure 20:
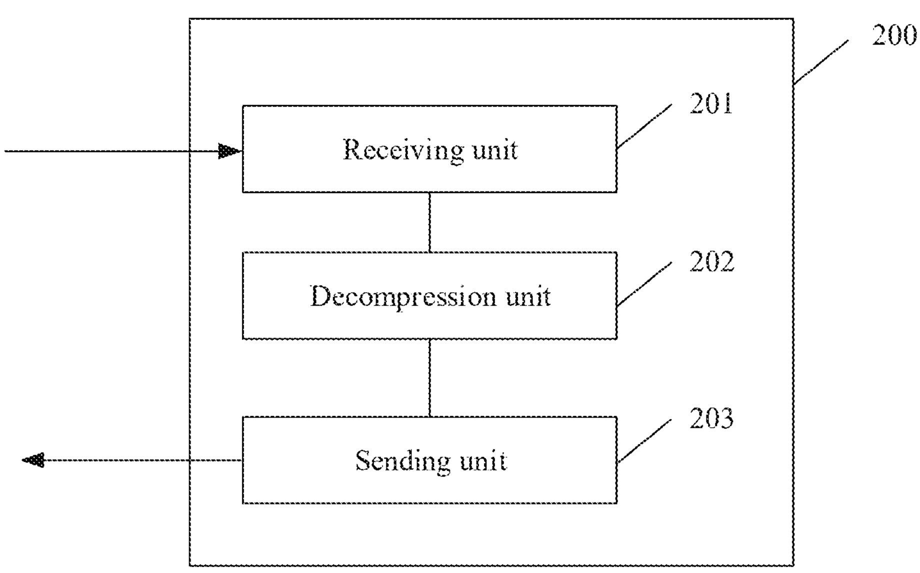
FIG. 20 is a diagram of a structure of an embodiment of a data packet decompression apparatus according to this application.

FIG. 20 is a diagram of a structure of an embodiment of a data packet decompression apparatus according to this application. The apparatus may be applied to a network side device. As shown in FIG. 20, the apparatus 200 may include:

a receiving unit 201, configured to receive a first PDCP data packet;

a decompression unit 202, configured to decompress the first PDCP data packet; and a sending unit 203, configured to send a first buffer data identifier to an electronic device if the first PDCP data packet fails to be decompressed, where the first buffer data identifier corresponds to buffer data used for decompressing the first PDCP data packet.

The receiving unit 201 is further configured to receive first buffer data sent by the electronic device, where the first buffer data corresponds to the first buffer data identifier, and the first buffer data is buffer data used for generating the first PDCP data packet.

The decompression unit 202 is further configured to decompress the first PDCP data packet by using the first buffer data.

In some embodiments, the first buffer data identifier may be an identifier of a decompression buffer used for decompressing the first PDCP data packet, or an identifier of a decompression buffer that is updated based on an original data packet of the first PDCP data packet, or an identifier of a compression buffer used for generating the first PDCP data packet, or an identifier of a compression buffer that is updated based on the original data packet of the first PDCP data packet.

In some embodiments, the receiving unit 201 may receive the first buffer data by using a control PDU.

Figure 21:
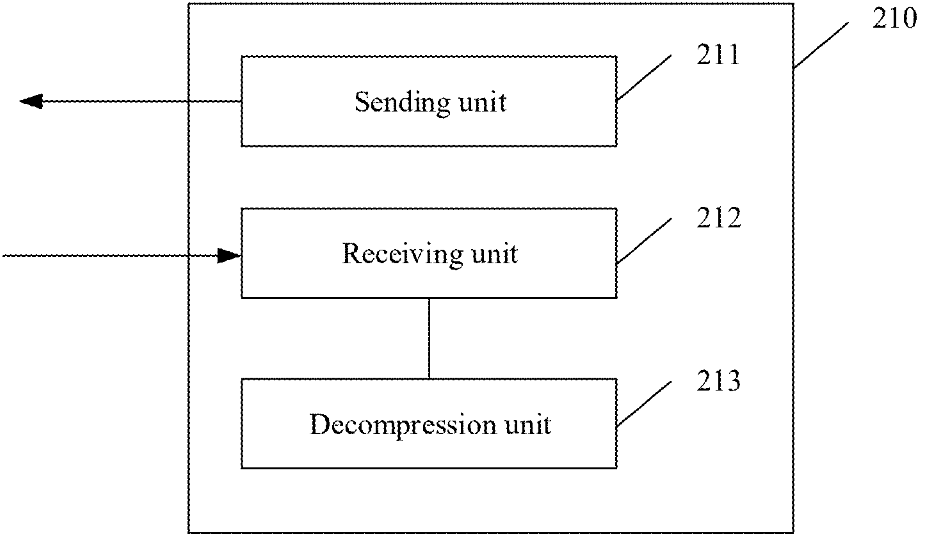
FIG. 21 is a diagram of a structure of another embodiment of a data packet decompression apparatus according to this application.

FIG. 21 is a diagram of a structure of another embodiment of a data packet decompression apparatus according to this application. The apparatus may be applied to a network side device. As shown in FIG. 21, the apparatus 210 may include:

a sending unit 211, configured to send a first identifier to an electronic device if a first PDCP data packet fails to be decompressed within first duration;

a receiving unit 212, configured to: receive a second PDCP data packet sent by the electronic device, where the second PCP data packet is sent after the electronic device receives the first identifier, and the second PDCP data packet is a next data packet of the first PDCP data packet; and receive second buffer data sent by the electronic device, where the second buffer data is sent after the electronic device receives the first identifier, and the second buffer data is buffer data used by the electronic device to generate the second PDCP data packet; and a decompression unit 213, configured to decompress the second PDCP data packet by using the second buffer data.

In some embodiments, the first identifier is an NACK.

In some embodiments, the receiving unit 212 may receive the first buffer data by using a control PDU.

Figure 22:
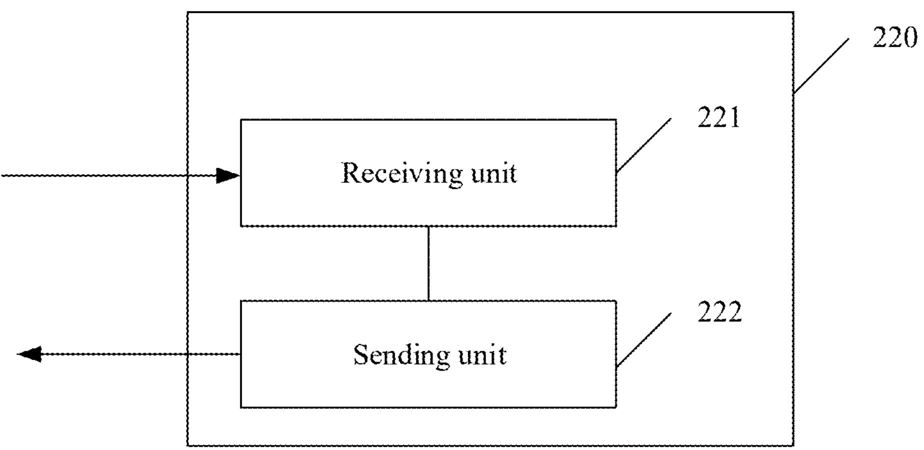
FIG. 22 is a diagram of a structure of still another embodiment of a data packet decompression apparatus according to this application.

FIG. 22 is a diagram of a structure of still another embodiment of a data packet decompression apparatus according to this application. The apparatus may be applied to an electronic device. As shown in FIG. 22, the apparatus 220 may include a receiving unit 221 and a sending unit 222.

In an embodiment, the receiving unit 221 is configured to receive a first buffer data identifier sent by a network side device, where the first buffer data identifier is sent after the network side device fails to decompress a received first PDCP data packet, and the first buffer data identifier corresponds to buffer data used for decompressing the first PDCP data packet; and the sending unit 222 is configured to send first buffer data corresponding to the first buffer data identifier to the network side device, where the first buffer data is buffer data used for generating the first PDCP data packet.

In some embodiments, the sending unit 222 may be further configured to determine that a size of the first buffer data does not exceed a preset maximum threshold.

In some embodiments, the sending unit 222 may be configured to send the first buffer data to the network side device by using a control protocol data unit.

In another embodiment, the receiving unit 221 is configured to receive a first identifier from a network side device, where the first identifier is used to indicate that the network side device fails to decompress a first PDCP data packet within first duration; and the sending unit 222 is configured to: in response to the first identifier, send a second PDCP data packet to the network side device, and send second buffer data to the network side device, where the second buffer data is buffer data used by the electronic device to generate the second PDCP data packet, and the second PDCP data packet is a next data packet of the first PDCP data packet.

In some embodiments, the first identifier is an NACK.

In some embodiments, the sending unit 222 may be further configured to determine that a size of the second buffer data does not exceed a preset maximum threshold.

In some embodiments, the sending unit 222 may be configured to send the second buffer data to the network side device by using a control protocol data unit.

Figure 23:
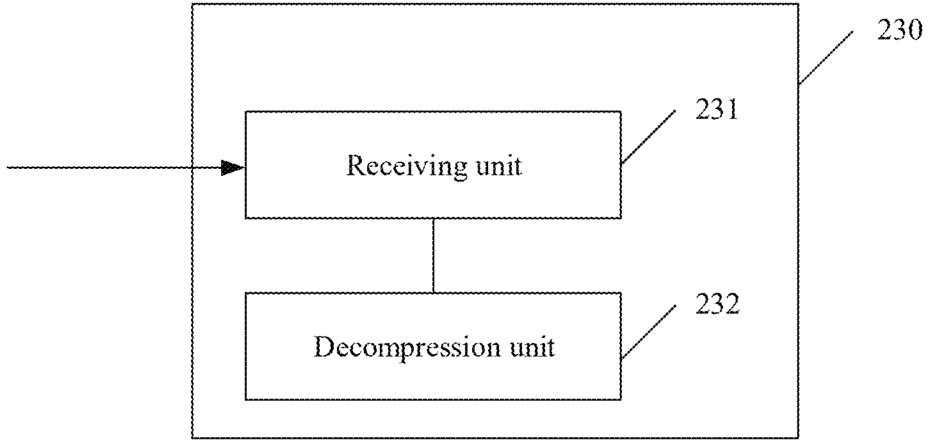
FIG. 23 is a diagram of a structure of still another embodiment of a data packet decompression apparatus according to this application.

FIG. 23 is a diagram of a structure of still another embodiment of a data packet decompression apparatus according to this application. The apparatus may be applied to a network side device. As shown in FIG. 23, the apparatus 230 may include:

a receiving unit 231, configured to receive second buffer data sent by an electronic device, where the second buffer data is sent after the electronic device detects that a quantity of retransmissions of at least one MAC packet corresponding to a first PDCP data packet reaches a preset quantity threshold, the second buffer data is buffer data used by the electronic device to generate a second PDCP data packet, and the second PDCP data packet is a next data packet of the first PDCP data packet; and a decompression unit 232, configured to decompress the received second PDCP data packet by using the second buffer data.

In some embodiments, the receiving unit 231 may receive the second buffer data by using a control protocol data unit.

Figure 24:
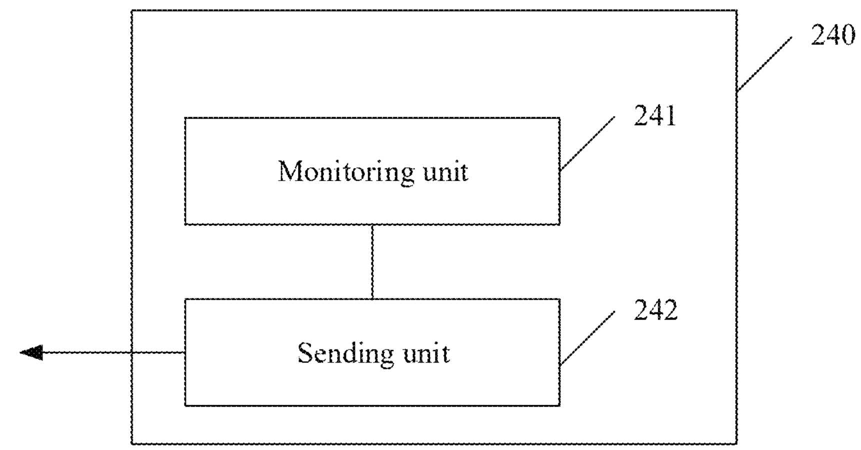
FIG. 24 is a diagram of a structure of still another embodiment of a data packet decompression apparatus according to this application.

FIG. 24 is a diagram of a structure of still another embodiment of a data packet decompression apparatus according to this application. The apparatus may be applied to an electronic device. As shown in FIG. 24, the apparatus 240 may include:

a monitoring unit 241, configured to monitor a transmission result of a media access control MAC packet corresponding to each PDCP data packet; and a sending unit 242, configured to send second buffer data to a network side device if the monitoring unit 241 detects that a quantity of retransmissions of at least one MAC packet corresponding to a first PDCP data packet reaches a preset quantity threshold, where the second buffer data is buffer data used by the electronic device to generate a second PDCP data packet, and the second PDCP data packet is a next data packet of the first PDCP data packet.

In some embodiments, the sending unit 242 may be further configured to determine that a size of the second buffer data does not exceed a preset maximum threshold.

In some embodiments, the sending unit 242 may be configured to send the second buffer data to the network side device by using a control protocol data unit.

The apparatuses provided in the embodiments shown in FIG. 20 to FIG. 24 may be configured to perform the technical solutions in the method embodiments shown in FIG. 8 to FIG. 19 of this application.

It should be understood that division into the units of the apparatuses shown in FIG. 20 to FIG. 24 is merely logical function division. In some embodiments, all or some of the units may be integrated into one physical entity or may be physically separated. In addition, all the units may be implemented in a form of software invoked by a processing element; or may be implemented in a form of hardware; or some units may be implemented in a form of software invoked by a processing element, and some units are implemented in a form of hardware. For example, the sending unit may be a separately disposed processing element, or may be integrated into a chip of an electronic device in some embodiments. In addition, all or some of the units may be integrated, or may be implemented independently. In some embodiments, operations of the foregoing methods or the foregoing units may be implemented by using an integrated logical circuit of hardware in the processing element, or by using instructions in a form of software.

For example, the foregoing units may be one or more integrated circuits configured to implement the foregoing methods, for example, one or more application-specific integrated circuits (ASICs), one or more digital signal processors (DSPs), or one or more field programmable gate arrays (FPGAs). For another example, the modules may be integrated together, and implemented in a form of a system-on-a-chip (SOC).

An embodiment of this application further provides a network side device, including one or more processors, a memory, and one or more computer programs. The one or more computer programs are stored in the memory, the one or more computer programs include instructions, and when the instructions are executed by the device, the device is enabled to perform the method provided in the embodiment shown in FIG. 8, FIG. 10, FIG. 12, FIG. 14, FIG. 16, or FIG. 18.

An embodiment of this application further provides an electronic device, including one or more processors, a memory, and one or more computer programs. The one or more computer programs are stored in the memory, the one or more computer programs include instructions, and when the instructions are executed by the device, the device is enabled to perform the method provided in the embodiment shown in FIG. 8, FIG. 10, FIG. 12, FIG. 15, FIG. 17, or FIG. 19.

This application further provides a network side device. The device includes a storage medium and a central processing unit. The storage medium may be a non-volatile storage medium. The storage medium stores a computer-executable program. The central processing unit is connected to the non-volatile storage medium, and executes the computer-executable program to implement the method provided in the embodiment shown in FIG. 8, FIG. 10, FIG. 12, FIG. 14, FIG. 16, or FIG. 18 of this application.

This application further provides an electronic device. The device includes a storage medium and a central processing unit. The storage medium may be a non-volatile storage medium. The storage medium stores a computer-executable program. The central processing unit is connected to the non-volatile storage medium, and executes the computer-executable program to implement the method provided in the embodiment shown in FIG. 8, FIG. 10, FIG. 12, FIG. 15, FIG. 17, or FIG. 19 of this application.

An embodiment of this application further provides a computer-readable storage medium. The computer-readable storage medium stores a computer program. When the computer program is run on a computer, the computer is enabled to perform the method provided in the embodiments shown in FIG. 8 to FIG. 19 in this application.

An embodiment of this application further provides a computer program product. The computer program product includes a computer program. When the computer program is run on a computer, the computer is enabled to perform the method provided in the embodiments shown in FIG. 8 to FIG. 19 in this application.

In embodiments of this application, "at least one" refers to one or more, and "a plurality of" refers to two or more. The term "and/or" describes an association relationship between associated objects and indicates that three relationships may exist. For example, A and/or B may indicate the following three cases: Only A exists, both A and B exist, and only B exists, where A and B may be singular or plural. The character "/" usually indicates an "or" relationship between the associated objects. "At least one of the following items" and a similar expression thereof refer to any combination of these items, including any combination of singular items or plural items. For example, at least one of a, b, and c may represent: a, b, c, a and b, a and c, b and c, or a, b, and c, where a, b, and c may be singular or plural.

A person of ordinary skill in the art may be aware that units and algorithm operations described in embodiments disclosed in this specification may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the embodiment goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In embodiments of this application, when any of the functions is implemented in a form of a software functional unit and sold or used as an independent product, the function may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, a network device, or the like) to perform all or some of the operations of the methods described in embodiments of this application. The foregoing storage medium includes any medium that can store program code, such as a USB flash drive, a removable hard disk, a read-only memory (ROM), a random access memory (RAM), a magnetic disk, or a compact disc.

The foregoing descriptions are merely embodiments of this application. Any variation or replacement readily figured out by a person skilled in the art within the technical scope disclosed in this application shall fall within the protection scope of this application. The protection scope of this application shall be subject to the protection scope of the claims.

What is claimed is:

1. A network side device, comprising:

one or more processors;

a memory; and one or more computer programs, wherein the one or more computer programs are stored in the memory, the one or more computer programs comprise instructions, and when the instructions are executed by the one or more processors, the network side device is to:

receive a first packet data convergence protocol (PDCP) data packet;

decompress the first PDCP data packet;

send a first buffer data identifier to an electronic device if the first PDCP data packet fails to be decompressed, wherein the first buffer data identifier corresponds to first buffer data used for decompressing the first PDCP data packet;

receive the first buffer data sent by the electronic device, wherein the first buffer data corresponds to the first buffer data identifier, and the first buffer data is buffer data used for generating the first PDCP data packet;

receive an indication from the electronic device to perform a buffer resetting procedure when a size of the first buffer data is determined to exceed a preset maximum threshold; and decompress the first PDCP data packet by using the first buffer data.

2. The network side device according to claim 1, wherein the device is further to:

determine whether the first PDCP data packet is successfully decompressed by determining whether a checksum of the first PDCP data packet is correct.

3. The network side device according to claim 1, wherein the device is further to:

update a decompression buffer by using the first buffer data;

decompress the first PDCP data packet based on the updated decompression buffer to obtain a first original data packet; and update the decompression buffer based on the first original data packet.

4. The network side device according to claim 1, wherein the device is further to:

obtain a first serial number (SN) from the first PDCP data packet; and send the first SN as the first buffer data identifier to the electronic device if the first PDCP data packet fails to be decompressed.

5. The network side device according to claim 1, wherein the first buffer data identifier is an identifier of a decompression buffer used for decompressing the first PDCP data packet, or an identifier of a decompression buffer that is updated based on an original data packet of the first PDCP data packet, or an identifier of a compression buffer used for generating the first PDCP data packet, or an identifier of a compression buffer that is updated based on the original data packet of the first PDCP data packet.

6. The network side device according to claim 1, wherein the device is further to:

receive the first buffer data by using a control protocol data unit.

7. An electronic device, comprising:

one or more processors;

a memory; and one or more computer programs, wherein the one or more computer programs are stored in the memory, the one or more computer programs comprise instructions, and when the instructions are executed by the one or more processors, the electronic device is to:

receive a first buffer data identifier sent by a network side device, wherein the first buffer data identifier is sent after the network side device fails to decompress a received first packet data convergence protocol (PDCP) data packet, and the first buffer data identifier corresponds to buffer data used for decompressing the first PDCP data packet;

send first buffer data corresponding to the first buffer data identifier to the network side device, wherein the first buffer data is buffer data used for generating the first PDCP data packet, determine that a size of the first buffer data does not exceed a preset maximum threshold; and indicate to the network side device to perform a buffer resetting procedure when the size of the first buffer data exceeds the preset maximum threshold.

8. The electronic device according to claim 7, wherein the electronic device is further to:

send the first buffer data to the network side device by using a control protocol data unit.

* * * * *